United States Patent [19]
Yanagi et al.

[11] Patent Number: 5,444,684
[45] Date of Patent: Aug. 22, 1995

[54] SEEK CONTROL SYSTEM OF DUAL PROCESSOR MAGNETO-OPTIC DISK UNIT

[75] Inventors: Shigenori Yanagi, Kawasaski; Kazuki Kudo, Tokyo; Kikuji Katoh, Tokorozawa, all of Japan

[73] Assignees: Fujitsu Limited, Kawasaki; Nippon Telegraph and Telephone Corporation, Tokyo, both of Japan

[21] Appl. No.: 266,314

[22] Filed: Jun. 27, 1994

Related U.S. Application Data

[63] Continuation of Ser. No. 852,291, filed as PCT/JP91/01335, Oct. 3, 1991, abandoned.

[30] Foreign Application Priority Data

Oct. 3, 1990 [JP] Japan .................. 2-265720
Oct. 3, 1990 [JP] Japan .................. 2-265721

[51] Int. Cl.⁶ .................. G11B 7/00
[52] U.S. Cl. .............. 369/44.28; 369/44.37; 369/32; 369/44.34
[58] Field of Search ........... 369/44.27, 44.28, 44.29, 369/44.37, 44.32, 44.11, 44.12, 32, 44.34, 13, 121

[56] References Cited

U.S. PATENT DOCUMENTS

| | | | |
|---|---|---|---|
| 4,845,696 | 7/1989 | Ohtsuki et al. | 369/13 |
| 5,086,419 | 2/1992 | Yanagi | 369/44.32 |
| 5,148,416 | 9/1992 | Hoshino et al. | 369/44.37 |
| 5,161,137 | 11/1992 | Suzuki | 369/44.28 |
| 5,163,033 | 11/1992 | Yanagi | 369/44.28 |

FOREIGN PATENT DOCUMENTS

| | | |
|---|---|---|
| 0332408 | 9/1989 | European Pat. Off. |
| 0387019 | 9/1990 | European Pat. Off. |
| 0392777 | 10/1990 | European Pat. Off. |
| 60-134395 | 7/1985 | Japan |
| 60-171637 | 9/1985 | Japan |
| 63-53727 | 3/1988 | Japan |
| 63-148428 | 6/1988 | Japan |
| 64-82336 | 3/1989 | Japan |
| 1-317228 | 12/1989 | Japan |
| 2-5225 | 1/1990 | Japan |

*Primary Examiner*—Georgia Y. Epps
*Assistant Examiner*—Nabil Hindi
*Attorney, Agent, or Firm*—Staas & Halsey

[57] ABSTRACT

A seek control system is used for a magneto-optic disk unit which has an optical head driven by a VCM positioner, two lens actuators disposed on the optical head, and respective object lenses disposed on the lens actuators for passing first and second beams (erase and write beams) to irradiate an identical track on a medium thereby to record and reproduce data thereto and therefrom. To shorten an access time needed for accessing a target track through a lens seek operation carried out by driving the two lens actuators and to prevent a deviation (off-track) of the second beam from the target track during the VCM positioner seek operation according to the first beam and shorten an access time, upon receiving a seek instruction from a higher device respective, exclusive use processors carry out the lens seek control of the first and second beams, in parallel. The number of tracks respectively crossed the first and second beams are counted so that, when the moving speed of the second beam decreases to a lens seek possible speed at a specified target track due to the positioner seek operation with the first beam, the lens seek operation with the second beam is started.

5 Claims, 20 Drawing Sheets

SEEK CONTROL SYSTEM OF DUAL PROCESSOR MAGNETO-OPTIC DISK UNIT

This application is a continuation-in-part of application number 07/852,241, filed as PCT/JP91/01335, Oct. 3, 1991, now abandoned.

TECHNICAL FIELD

This invention relates to a seek control system of a magneto-optic disk unit having an optical head, a VCM positioner with a voice coil motor (VCM) for driving the optical head, and two lens actuators disposed on the optical head, for positioning two beams on the same track on a medium thereby to simultaneously erase and write the track.

BACKGROUND ART

A magneto-optic disk unit must clear a target track before writing data to the target track. Namely, it must carry out an erase operation before a write operation on the target track. Since it takes a long time if the erase and write operations are done separately, a recent magneto-optic disk unit emits an erase beam and a write beam in respective vicinities of a target track, to carry out the write operation immediately after the erase operation.

To realize such a simultaneous operation, the disk unit has an optical head which is moved across tracks by a VCM positioner, two lens actuators (track actuators) disposed on the optical head, and object lenses arranged on the lens actuators to pass the erase and write beams respectively. According to tracking error signals provided by these beams, the disk unit carries out track servo control to trace the target track.

The disk unit also carries out a seek operation by driving the lens actuators. This seek operation is controlled by a processor and carried out with, for example, the write beam at first and then with the erase beam. This raises a problem of increasing an access time in proportion to the number of the beams. This access time must be minimized.

When seeking a target track with the erase beam, the disk unit drives the VCM positioner while counting the number of tracks crossed by the erase beam according to the tracking error signal of the erase beam. After the completion of the seek operation with the erase beam, the unit starts the track servo control. At this time, the unit sets the write beam on the target track without counting the number of tracks crossed by the write beam. Accordingly, the write beam may deviate from the target track. The unit corrects this deviation through a corrective seek operation, which needs time. This means that, to shorten the access time, it is necessary to prevent a deviation of the write beam during the VCM positioner seek operation.

DISCLOSURE OF THE INVENTION

The invention provides a seek control system of a magneto-optic disk unit having an optical head driven by a VCM positioner, two lens actuators disposed on the optical head, and respective object lenses disposed on the lens actuators for passing first and second beams (erase and write beams) to irradiate an identical track on a medium to record and reproduce data thereto and therefrom.

An object of the invention is to shorten an access time needed for accessing a target track through a lens seek operation carried out by driving the two lens actuators. Another object of the invention is to prevent a deviation (off-track) of the second beam from the target track during the VCM positioner seek operation carried out according to the first beam, and thereby to shorten the access time.

According to an aspect of the invention, exclusive-use processors are provided for carrying out lens seek control of the first and second beams. Upon receiving a seek instruction from a higher device (e.g. an external source), the processors carry out the lens seek operations of the two beams in parallel.

According to another aspect of the invention, the number of tracks crossed by the first beam as well as that crossed by the second beam are counted. When the moving speed of the second beam decreases to a lens seek possible speed at a target track due to the positioner seek operation carried out with the first beam, the lens seek operation with the second beam is carried out.

BEST MODE OF CARRYING OUT THE INVENTION

Before explaining the present invention, a prior art will be explained with reference to FIGS. 8 through 10.

Figure 8:
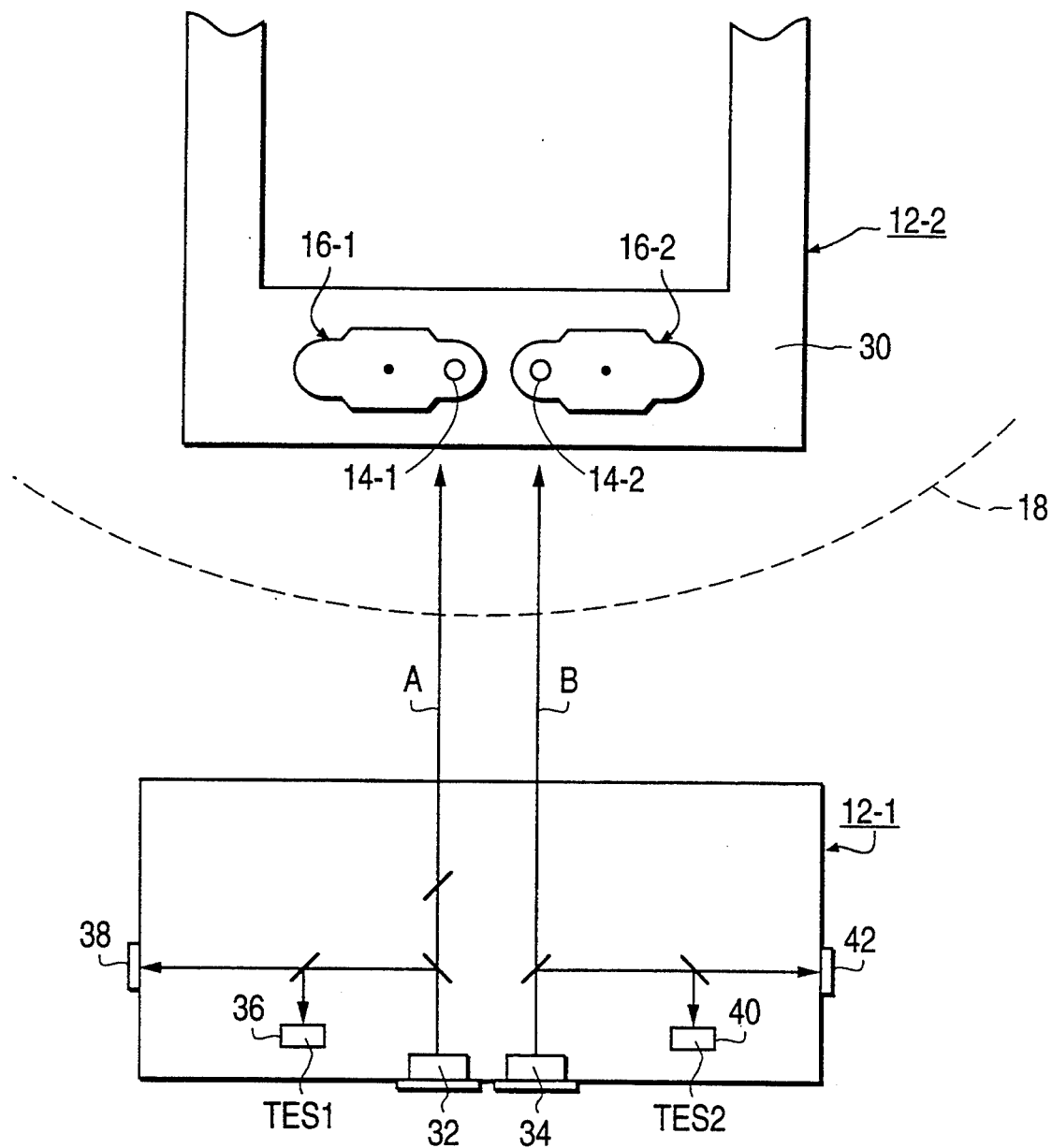
FIG. 8 is a schematic view showing an optical head according to a prior art.

FIG. 8 is a plan view showing a two-actuator optical head according to the prior art.

In FIG. 8, numeral 18 is a magneto-optic disk serving as a medium. For the magneto-optic disk 18, a fixed optical system 12-1 and a movable optical system 12-2 are arranged on a carriage 30 that is moved across tracks by a VCM positioner.

The fixed optical system 12-1 has a writing semiconductor laser 32 and an erasing semiconductor laser 34. A first beam A is a write beam, and a second beam B an erase beam.

The movable optical system 12-2 has two two-dimensionally rocking lens actuators 16-1 and 16-2 for moving object lenses 14-1 and 14-2 across tracks according to controlled rotations of respectively mounting arms, and axially moving the object lenses 14-1 and 14-2 for focusing.

The semiconductor laser 32 of the fixed optical system 12-1 emits the write beam A, which passes through a writing optical system and the object lens 14-1 of the lens actuator 16-1 disposed on the movable optical system 12-2, and irradiates the magneto-optic disk 18. A return beam from the magneto-optical disk 18 passes through the writing optical system and is received by a tracking error detector 36 employing a two-piece photosensor. The tracking error detector 36 detects a tracking error signal TES1 from the reflected and received write beam A according to a push-pull method (a far field method). Namely, the two-piece photosensor has two photosensors that are symmetrically arranged on respective, opposite sides of a track center, for receiving a return beam reflected and diffracted by a guide groove on the magneto-optic disk 18, and providing a difference of the outputs of the photosensors as the tracking error signal TES1. Numeral 38 is a photosensor for detecting a focus error.

The semiconductor laser 34 emits the erase beam B, which passes through the object lens 14-2 of the lens actuator 16-2, and irradiates, in the vicinity of the write beam A, the same track of the magneto-optic disk 18 as that irradiated by the write beam A. A return beam of the erase beam B passes through the same route and enters a tracking error detector 40 employing a two-piece photosensor to provide a tracking error signal TES2 according to the erase beam B. Numeral 42 is a photosensor for detecting a focus error.

Figure 9:
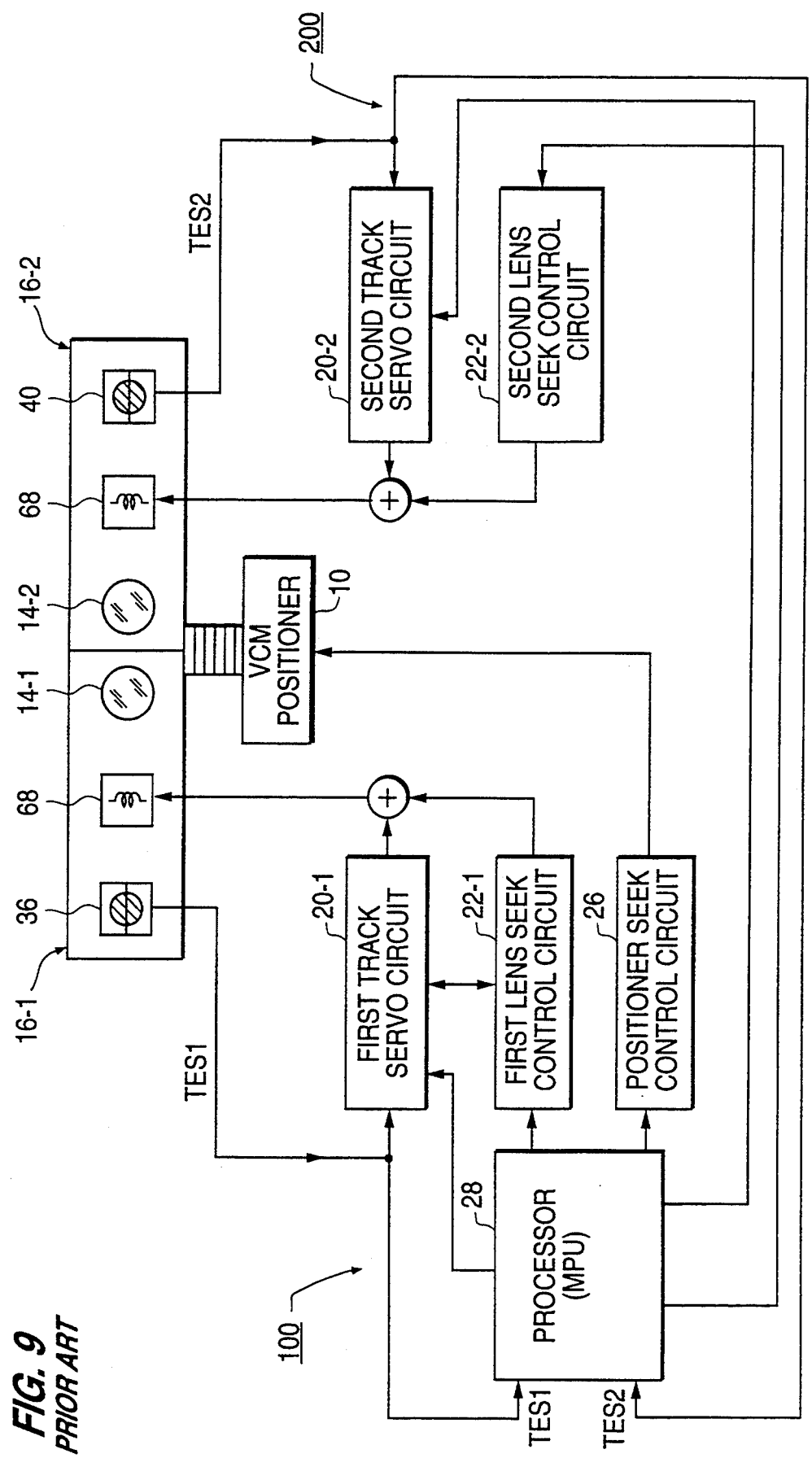
FIG. 9 is a schematic view showing lens seek control according to the prior art.

FIG. 9 is a schematic view showing the conventional seek control system.

In FIG. 9, a write beam position control portion 100 comprises a first track servo circuit 20-1 for driving the lens actuator 16-1 according to the tracking error signal TES1 of the write beam, to carry out tracking control of the write beam; a first lens seek control circuit 22-1 for driving the lens actuator 16-1 to seek a target track with the write beam; and a positioner seek control circuit 26 for driving the VCM positioner 10 according to the write beam, to move the write and erase beams to a target track.

An erase beam position control portion 200 comprises a second track servo circuit 20-2 for driving the lens actuator 16-2 according to the tracking error signal TES2 of the erase beam, to carry out tracking control of the erase beam; and a second lens seek control circuit 22-2 for driving the lens actuator 16-2, to seek the target track with the erase beam.

A processor (MPU) 28 totally controls the position control portions 100 and 200.

Upon receiving a seek instruction from a higher controller, the processor 28 seeks a target track with the write beam. This seek operation with the write beam turns OFF the servo control by the first track servo circuit 20-1 on the present track, turns ON the first lens seek control circuit 22-1, and drives the lens actuator 16-1 to move the write beam to the target track. After the write beam reaches the target track, the first track servo circuit 20-1 is again turned ON to set the beam on the track.

After the lens seek operation with the write beam is completed, the processor 28 starts a lens seek operation with the erase beam. Namely, the processor turns OFF the track servo control by the second track servo circuit 20-2, and drives the lens actuator 16-2 to seek the track with the erase beam. When the erase beam reaches the target track, the processor again turns ON the second track servo circuit 20-2 to set the erase beam on the target track.

Figure 10:
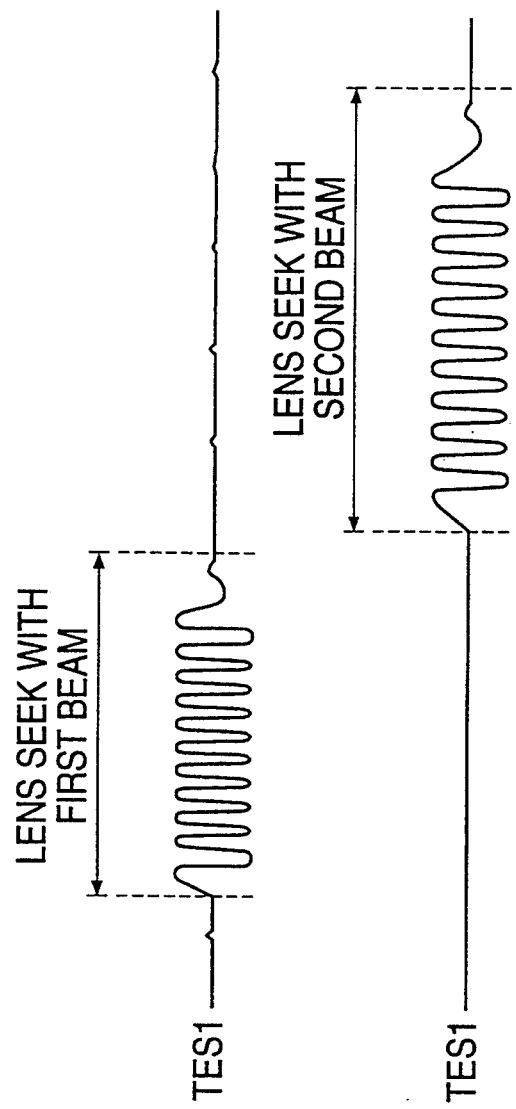
FIG. 10 is an explanatory view showing a lens seek operation according to the prior art.

According to the lens seek control of the conventional two-actuator system, the processor sequentially seeks the target track with the first beam, i.e., the write beam, and then with the second beam, i.e., the erase beam, as indicated with the tracking error signals TES1 and TES2 of the write and read beams shown in FIG. 10. Accordingly, the system needs a longer access time than a single beam magneto-optic disk unit.

To solve the problem of the conventional system, an object of one aspect of the invention is to shorten the access time of a lens seek operation carried out by driving two lens actuators.

Figure 1:
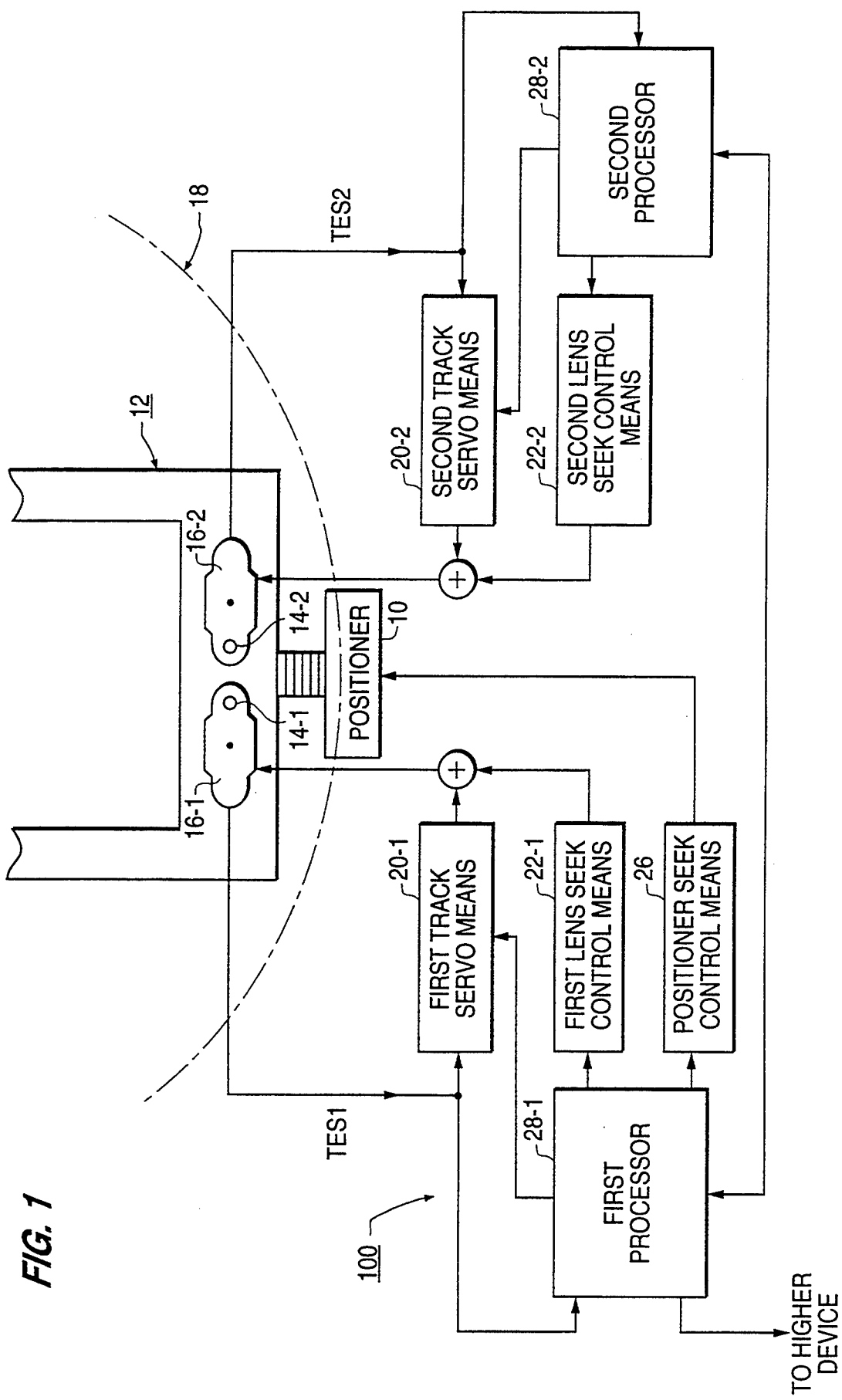
FIG. 1 is a view explaining a principle of an aspect of the invention.

FIG. 1 explains a principle of the one aspect of the invention.

This invention is applicable for a magneto-optic disk unit having a positioner 10, an optical head 12 driven by the positioner 10 across tracks of a medium, and first and second lens actuators 16-1 and 16-2 having object lenses 14-1 and 14-2, respectively. First and second beams are emitted through the object lenses 14-1 and 14-2 onto the same track on the medium 18.

A seek control system according to the invention for this sort of magneto-optic disk unit comprises:
  first track servo means 20-1 for driving the first lens actuator 16-1 according to a tracking error signal TES1 of the first beam, to carry out tracking control of the first beam;
  first lens seek control means 22-1 for driving the first lens actuator 16-1 to seek a target track with the first beam;
  a first processor 28-1 for turning OFF the track servo control by the first track servo means 20-1 and ON the first lens seek control means 22-1 upon receiving a seek instruction from a higher device, to start a lens seek operation;
  second track servo means 20-2 for driving the second lens actuator 16-2 according to a tracking error signal TES2 of the second beam, to carry out tracking control of the second beam;
  second lens seek control means 22-2 for driving the second lens actuator 16-2 to seek the target track with the second beam; and
  a second processor 28-2 for turning OFF the track servo control by the second track servo means 20-2 and ON the second lens seek means 22-2 upon receiving the seek instruction of the higher device through the first processor 28-1, to start a lens seek operation.

The second processor 28-2 notifies the first processor 28-1 of the completion of the seek operation with the second beam, and the first processor 28-1 notifies the higher device of the completion of the seek operation upon receiving the seek completion notice from the second processor 28-1 after the completion of the seek operation with the first beam.

The first processor 28-1 controls positioner seek control means 26 for driving the positioner 10 according to the first beam, to move the first and second beams to the target track, and the second processor 28-2 does not control the positioner seek control means (26).

The seek control system of the magneto-optic disk unit according to the one aspect of the invention employs the first and second processors 28-1 and 28-2 which operate individually and exclusively for positioning the first and second beams, respectively. Upon receiving an access instruction from the higher device, the two processors simultaneously seek a target track with the first and second beams, respectively and in parallel, to shorten an access time to a level substantially equal to an access time of a single beam optical disk unit.

Figure 2:
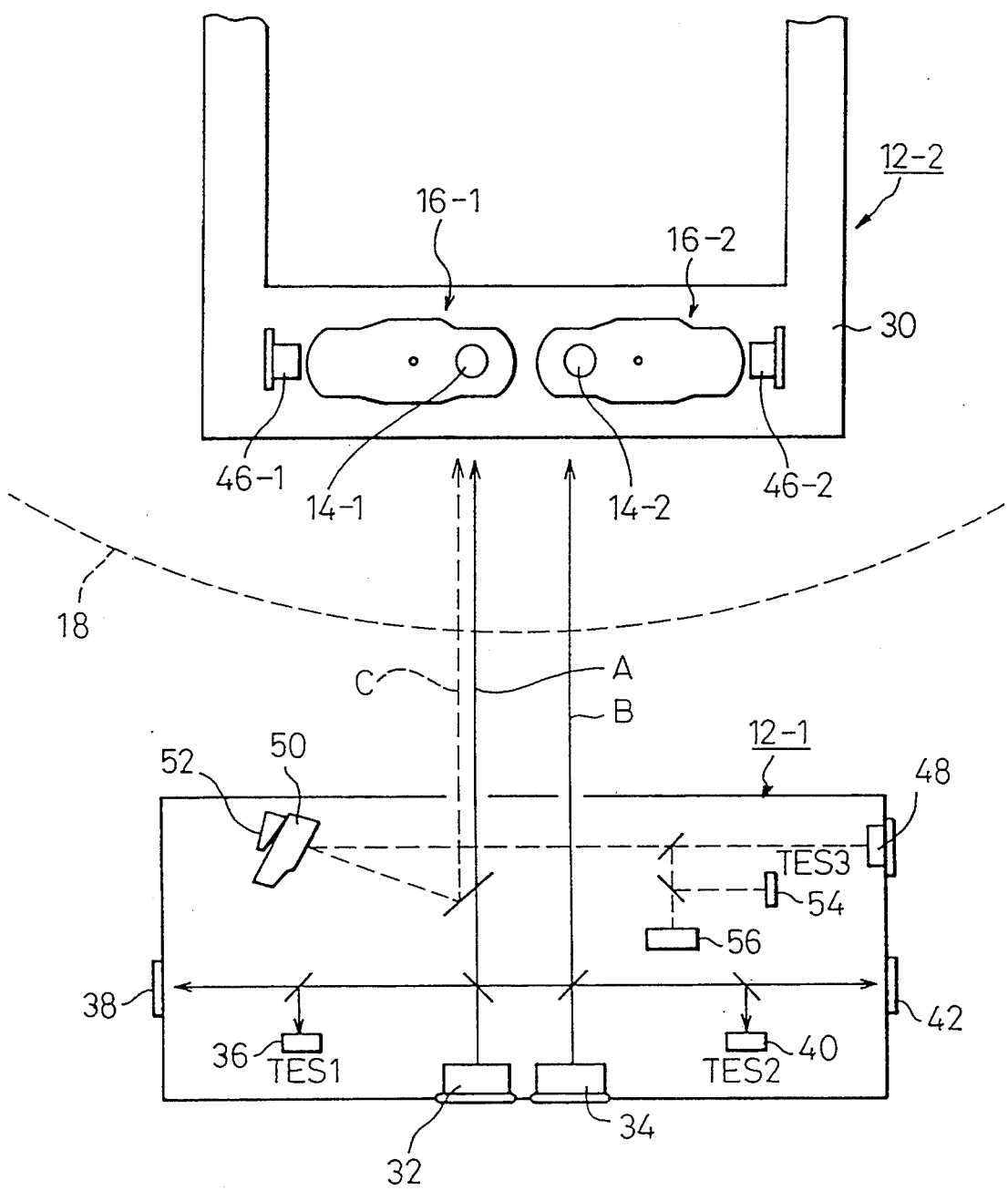
FIG. 2 is a schematic view showing an optical head according to the invention.

FIG. 2 is a plan view showing an optical head of a magneto-optic disk unit according to the invention.

In FIG. 2, the optical head comprises a fixed optical system 12-1 fixed to a unit frame, and a movable optical system 12-2 mounted on a carriage 30 of a VCM positioner to be explained later and moved across tracks on a magneto-optic disk 18.

The movable optical system 12-2 has a first lens actuator 16-1 and a second lens actuator 16-2 disposed on the carriage 30. For example, these are two-dimensionally rocking lens actuators. The lens actuator 16-1 has an object lens 14-1 for passing a first beam, i.e., a write beam A, and the lens actuator 16-2 has an object lens 14-2 for passing a second beam, i.e., an erase beam B. According to rotations of the actuators driven by tracking coils, the object lenses 14-1 and 14-2 are moved across the tracks, to achieve tracking control and lens seek operation. Behind the lens actuators 16-1 and 16-2, there are arranged lens position detectors 46-1 and 46-2 for optically detecting the positions of the lenses.

Figure 4:
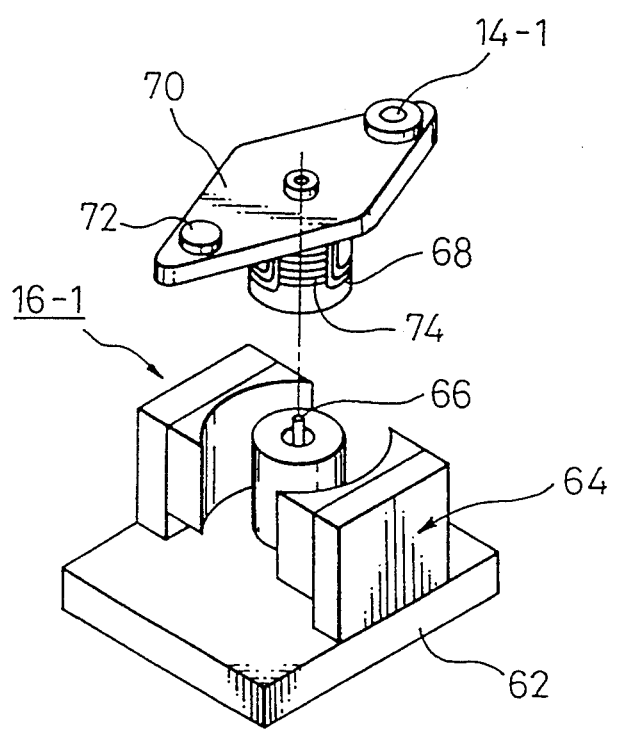
FIG. 4 is an exploded view showing a lens actuator according to the invention.

FIG. 4 is an exploded view showing the lens actuator 16-1, which is identical to the lens actuator 16-2.

In FIG. 4, the lens actuator 16-1 comprises a base 62, a magnetic circuit 64 fixed on the base, and an upright slide shaft 66 disposed at the center of the magnetic circuit 64. With respect to this fixed portion on the base 62, a movable portion is a rotary arm 70. The rotary arm 70 has a lower cylindrical portion around which a tracking coil 68 and a focus coil 74 are arranged. One end of the rotary arm 70 has the object lens 14-1, and the other end a balance weight 72. A center hole of the rotary arm 70 engages with the slide shaft 66 of the base 62. The rotary arm 70 is turned around the shaft to carry out the tracking control and lens seek operation, and slid axially along the shaft to carry out focusing control.

The lens actuators 16-1 and 16-2 of the invention are not limited to the two-dimensionally rocking type of FIG. 4 but may be of any type having a proper structure.

Referring again to FIG. 2, the fixed optical system 12-1 includes a semiconductor laser 32 for emitting a write beam A having a wavelength of 836 to 845 nm, and a semiconductor laser 34 for emitting an erase beam B having a wavelength of 836 to 845 nm. The write beam A from the semiconductor laser 32 passes through a writing optical system to be explained later, reaches the movable optical system 12-2, passes through the object lens 14-1 of the lens actuator 16-1, and forms a beam spot on a track on the magneto-optic disk 18. A return beam of the write beam A passes oppositely through the same route and returns to the fixed optical system 12-1. The return beam is split by the fixed optical system 12-1 and made incident on a tracking error detector 36 for detecting a tracking error signal TES1 of the write beam A and on a photosensor 38 for detecting a focus error.

On the other hand, the erase beam B from the semiconductor laser 34 passes through an erasing optical system to be explained later, reaches the movable optical system 12-2, passes through the object lens 14-2 of the lens actuator 16-2, and forms a beam spot on the same track as that irradiated with the write beam A, in the vicinity of the write beam A. A return beam of the erase beam B passes oppositely through the same route. The return beam is split by the fixed optical system 12-1 and made incident on a tracking error detector 40 for detecting a tracking error signal TES2 of the erase beam B and on a photosensor 42 for detecting a focus error.

According to the embodiment of FIG. 2, the object lens 14-1 passes a read beam C in addition to the write beam A. This enables a verify read operation to be carried out just after a write operation. The read beam C is a laser beam having a wavelength of 780 to 789 nm and emitted by a semiconductor laser 48. The read beam C is reflected by a galvanomirror 50 disposed in a reading optical system to be explained later, and passed through the object lens 14-1 of the lens actuator 16-1. The beam C then forms a beam spot on the same as that irradiated with the write beam A or on a proper located a predetermined number of tracks away from the track irradiated with the write beam A. A return beam of the read beam passes through the same route in an opposite direction, is reflected by the galvanomirror 50, split and made incident on a tracking error detector 54 for detecting a tracking error signal TES3 of the read beam C and on a photosensor 56 for detecting a high-frequency signal. The galvanomirror 50 has a galvanomirror position detector 52 for optically detecting the position of the mirror.

Figure 3:
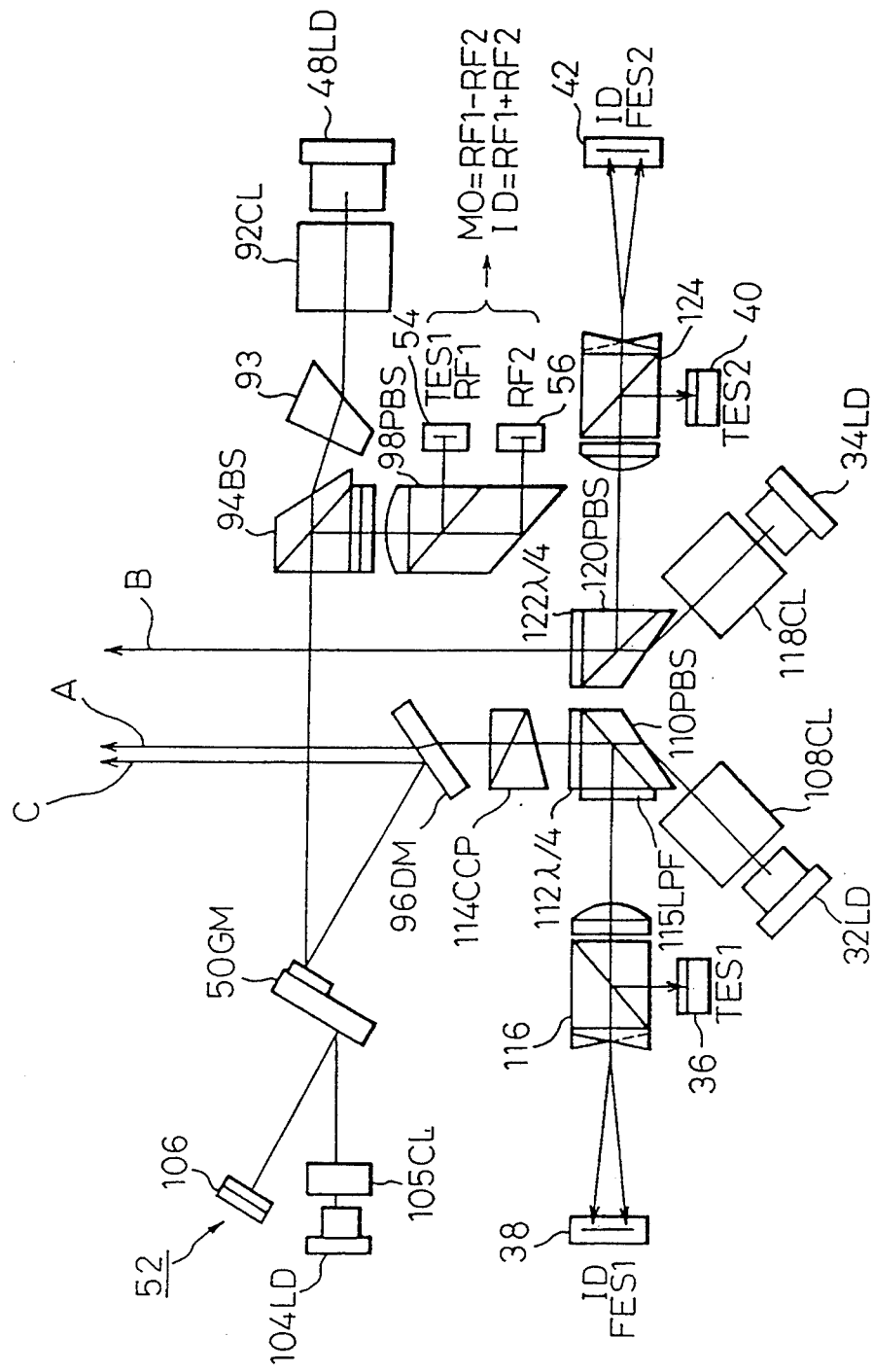
FIG. 3 is a schematic view showing a head optical system according to the invention.

The details of the head optical system of FIG. 2 will be explained with reference to FIG. 3. For ease of reference, the elements identified in the following text are set forth in FIG. 3 as acronyms following the numerical designations of those elements.

Firstly, the optical system for the first beam, i.e., the write beam A will be explained.

The semiconductor laser diode (LD) 32 emits a pulse beam according to a data bit of 1 or 0. The beam is converted into a coherent beam by a collimator lens 108, passed through a polarization beam splitter 110, a $\lambda/4$ plate 112, a color correction prism (CCP) 114, and a dichroic mirror 96, and provided to the object lens 14-1 of the movable optical system of FIG. 2. The beam is then passed through the object lens 14-1 and emitted to the magneto-optic disk 18. A return beam from the magneto-optic disk 18 is passed in the opposite direction through the same route, made incident on the polarization beam splitter 110, reflected by the polarization beam splitter 110 in an orthogonal direction, passed through a low-pass filter 115, and made incident on a Foucault optical unit 116. The Foucault optical unit 116 is for providing a focus error signal FES1 according to Foucault's method. The beam from the Foucault optical unit 116 is made incident on the photosensor 38, which provides the focus error signal FES1 for the write beam A as well as an ID signal corresponding to a light intensity determined by irregularities of a preformatted, or pre-formed, track. The return beam of the write beam A, reflected by the Foucault optical unit 116 in an orthogonal direction is directed to the tracking error detector 36, which provides the tracking error signal TES1 of the write beam A according to the push-pull method (far field method). The reason why the low-pass filter 115 is disposed in the path is because, when an immediate reading operation with the read beam is carried out just after a write operation, the magneto-optic disk 18 provides a return beam of the write beam A as well as a return beam of the read beam C. Accordingly, the low-pass filter 115 passes only the return beam of the write beam A having a longer wavelength and blocks the return beam of the read beam C having a shorter wavelength.

Next, the optical system for the second beam, i.e., the erase beam B will be explained.

The semiconductor laser diode 34 (LD) provides a beam which is converted into a coherent beam by a collimator lens 118. The coherent beam is passed through a polarization beam splitter 120 and a λ/4 plate 122, and provided to the object lens 14-2 of the movable optical system of FIG. 2, to irradiate the magneto-optic disk 18. A return beam from the magneto-optic disk 18 is reflected by the polarization beam splitter 120 in an orthogonal direction, passed through a Foucault optical unit 124, and made incident on the photosensor 42. The photosensor 42 provides a focus error signal FES2 for the erase beam B as well as an ID signal corresponding to a light intensity of a preformatted or preformed, track portion. The return beam separated by the Foucault optical unit 124, is made incident on the tracking error detector 40, which provides, according to the outputs of a two-piece photosensor, a tracking error signal TES2 of the erase beam B according to the push-pull method (far field method).

The head optical system for the read beam C for carrying out a read operation just after a write operation now will be explained.

A semiconductor laser 48 (LD) provides a beam which is converted into a coherent beam by a collimator lens 92. A prism 93 changes the direction of the coherent beam, which is passed through a beam splitter 94, and made incident to the galvanomirror 50. The beam is reflected by the galvanomirror 50 and by the dichroic mirror 96, passed through the object lens 14-1 of the movable optical system of FIG. 2, and emitted to the magneto-optic disk 18. A return beam from the magneto-optic disk 18 is reflected by the dichroic mirror 96 and galvanomirror 50, and made incident to the beam splitter 94, which reflects the beam in an orthogonal direction. The beam is then made incident on a polarization beam splitter 98, which splits the beam into two parts, respectively for a tracking error detector 54 and for a photosensor 56. The tracking error detector 54 provides a tracking error signal TES3 and a signal RF1 based on the read beam C according to the push-pull method (far field method). The photosensor 56 provides a signal RF2. A subtraction operation of the signals RF1 and RF2 provided by the tracking error detector 54 and photosensor 56 provides a reproduced magneto-optic signal MO, and an addition operation thereof provides an ID signal indicting an intensity due to irregularities of a preformatted, or preformed, portion of a track. Namely, the magneto-optic signal MO and preformat ID signal are obtained as follows:

MO = RF1 − RF2

ID = RF1 + RF2

The galvanomirror 50 of the optical system for the read beam C involves the galvanomirror position detector 52 for detecting the position of the mirror. The detector 52 comprises a semiconductor laser 104 (LD), a collimator lens 105, and a two-piece photosensor 106.

Figure 5:
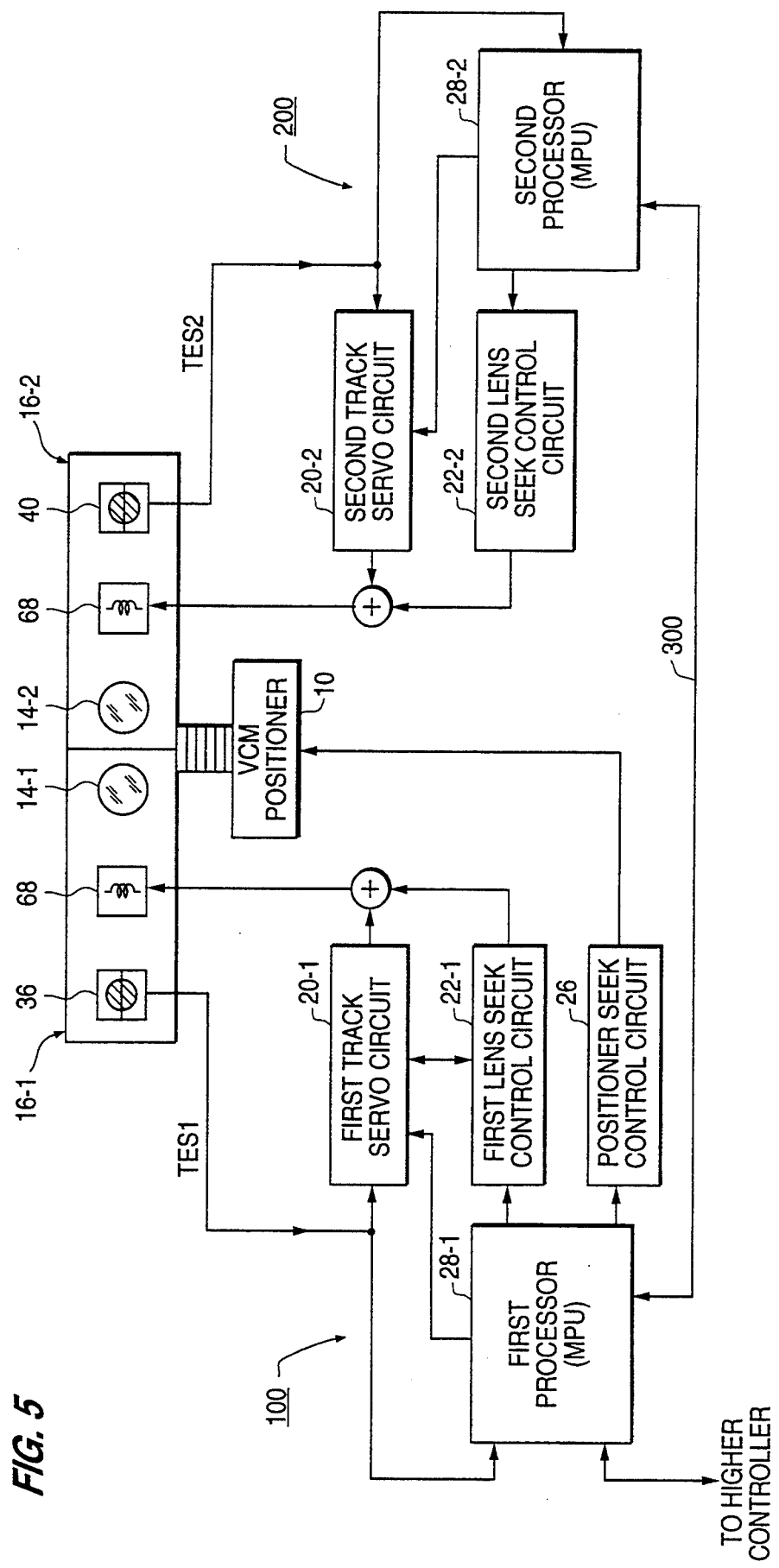
FIG. 5 is a schematic view showing an embodiment of the invention of FIG. 1.

FIG. 5 is a schematic view showing a seek control system according to an embodiment of the invention.

In FIG. 5, the lens actuator 16-1 for the write beam and the lens actuator 16-2 for the erase beam are driven and moved by the same VCM positioner 10. The lens actuators 16-1 and 16-2 include the tracking error detectors 36 and 40, tracking coils 68, and object lenses 14-1 and 14-2, respectively.

Firstly, a position control portion 100 for controlling the write beam through the lens actuator 16-1 will be explained.

The write beam position control portion 100 comprises a first track servo circuit 20-1 for driving the first lens actuator 16-1 according to the tracking error signal TES1 of the write beam, to carry out tracking control of the write beam; a first lens seek control circuit 22-1 for driving the first lens actuator 16-1 to seek a target track with the write beam; a positioner seek control circuit 26 for driving the VCM positioner 10 according to the write beam, thereby to move the write and erase beams to a target track; and a first processor 28-1 (MPU) for totally controlling the write beam side.

On the other hand, a position control portion 200 for the erase beam comprises a second track servo circuit 20-2 for driving the second lens actuator 16-2 according to the tracking error signal TES2 of the erase beam, to carry out tracking control of the erase beam; a second lens seek control circuit 22-2 for driving the second lens actuator 16-2 to seek the target track with the erase beam; and a second processor (MPU) 28-2 for totally controlling the erase beam side. Between the first processor 18-1 and the second processor 28-2, there is arranged a communication bus 300 for communicating control process information between the processors.

A lens seek operation according to the embodiment of FIG. 5 will be explained with reference to a flow-chart of FIG. 6.

Figure 6:
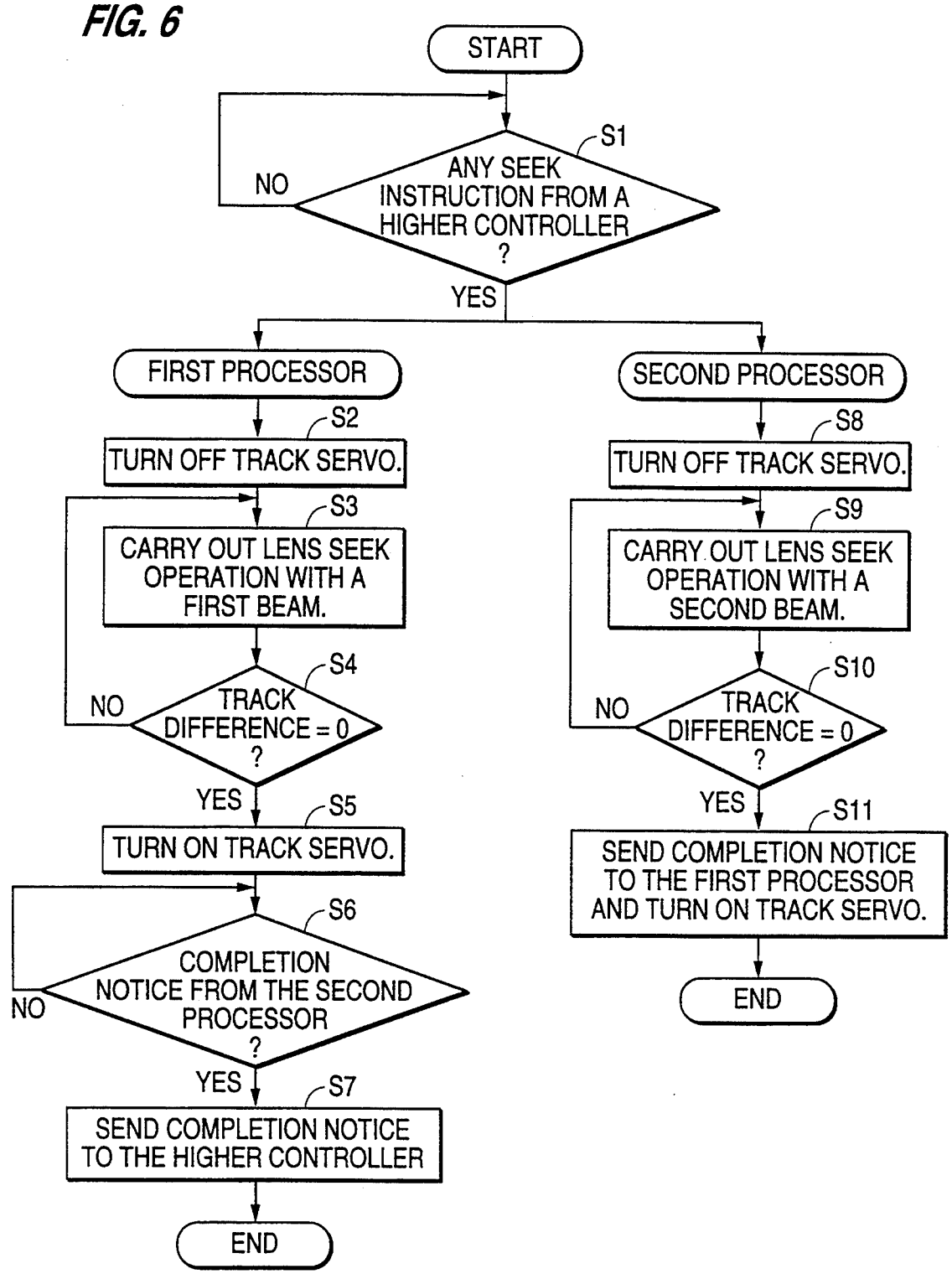
FIG. 6 is an explanatory view showing a lens seek operation according to the invention of FIG. 1.

In FIG. 6, Step S1 (hereinafter, the word "Step" is omitted) monitors a seek instruction from a higher controller through the first processor 28-1. Upon receiving the seek instruction, S1 starts a lens seek operation of its own, and at the same time, notifies the second processor 28-2 of the contents of the seek instruction, thereby starting a lens seek operation of the second processor 28-2. As used throughout, the functions of turning ON and turning OFF shall be understood to mean enabling and disabling, respectively, the involved function.

On the first processor 28-1 side, S2 turns OFF the first track servo circuit 20-1 to cancel the present tracking operation of the write beam. Then, S3 turns ON the first lens seek control circuit 22-1, which seeks a target track. Namely, the first lens seek control circuit 22-1 supplies a current to drive the tracking coil 68 of the lens actuator 16-1, to control the speed of the lens actuator. The first processor 28-1 receives a tracking error signal TES1 through this seek operation, and detects crossed tracks according to, for example, zero crossings. During the lens seek operation of S3, S4 monitors whether or not a track difference has zeroed, i.e., whether or not the beam has reached the target track. If the track difference has zeroed and thus the beam has reached the target track, S5 again turns ON the first track servo circuit 20-1 to set the write beam on the target track. This completes the lens seek operation. S6 waits for a seek completion notice from the second processor 28-2 that has simultaneously started the lens seek operation. Upon receiving the seek completion notice for the erase beam from the second processor 28-2, S7 notifies the higher controller of the completion of the seek operation.

On the second processor 28-2 side that has started the lens seek operation for the erase beam simultaneously with the first processor 28-1, S8 turns OFF the second track servo circuit 20-2 to cancel the present tracking operation of the erase beam. S9 seeks the target track with the erase beam. The number of tracks crossed by the erase beam during the lens seek operation is detected from the number of zero crossings of the tracking error signal TES2. S10 monitors whether or not a track difference for the erase beam has zeroed. If the track difference has zeroed and thus the beam has reached the target track, S11 notifies the first processor 28-1 of the completion of the seek operation with the erase beam and at the same time, turns ON the second track servo circuit 28-2 to set the erase beam on the target track.

Figure 7:
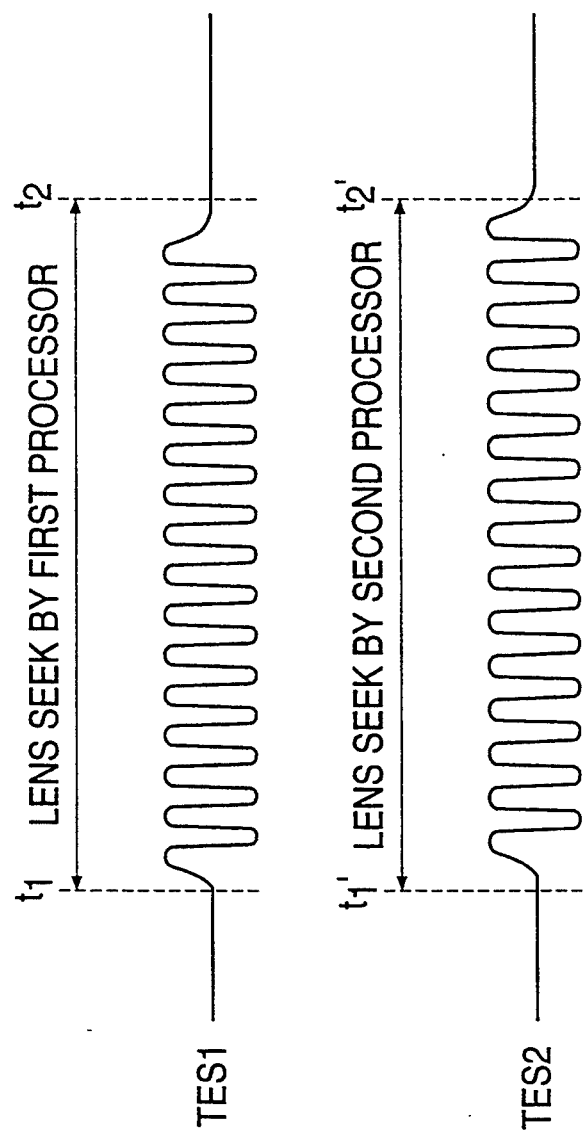
FIG. 7 is an explanatory view showing a positioner seek operation according to the invention of FIG. 1.

According to the lens seek operation of the invention shown in FIG. 6, the lens seek operation with the write beam by the first processor 28-1 and the lens seek operation with the erase beam by the second processor 28-2 are simultaneously started at time t1 as shown in FIG. 7, and completed at time t2 and t2' which are different from each other due to characteristics of the beam systems. Since the lens seek operations with the two beams are carried out in parallel with each other, the invention can substantially halve an access time compared with the conventional system that sequentially carries out the operations one after another.

In the embodiment of FIG. 5, a positioner seek operation by driving the VCM positioner 10 is controlled by the first processor 28-1. During the positioner seek operation, the track servo and lens seek operations on the second processor 28-2 side are both turned OFF, and only position locking control for suppressing abnormal motions of the actuator due to, for example, external vibration is carried out.

For the read beam C that is passed through the object lens 14-1, similarly to the write beam A of the embodiment of FIG. 2, the galvanomirror 50 may be driven to control the position of the read beam relative to the position of the write beam.

As explained above, the first aspect of the invention arranges two lens actuators on a single optical head for controlling the positions of first and second beams, and provides the actuators with processors for exclusively and independently controlling the actuators. This arrangement can simultaneously carry out lens seek operations for the first and second beams in response to a seek instruction from a higher device, to thereby shorten a track access time to a level substantially equal to that of a single-beam magneto-optic disk unit. Accordingly, the first aspect of the invention achieves a track access operation at a high speed.

Figure 11:
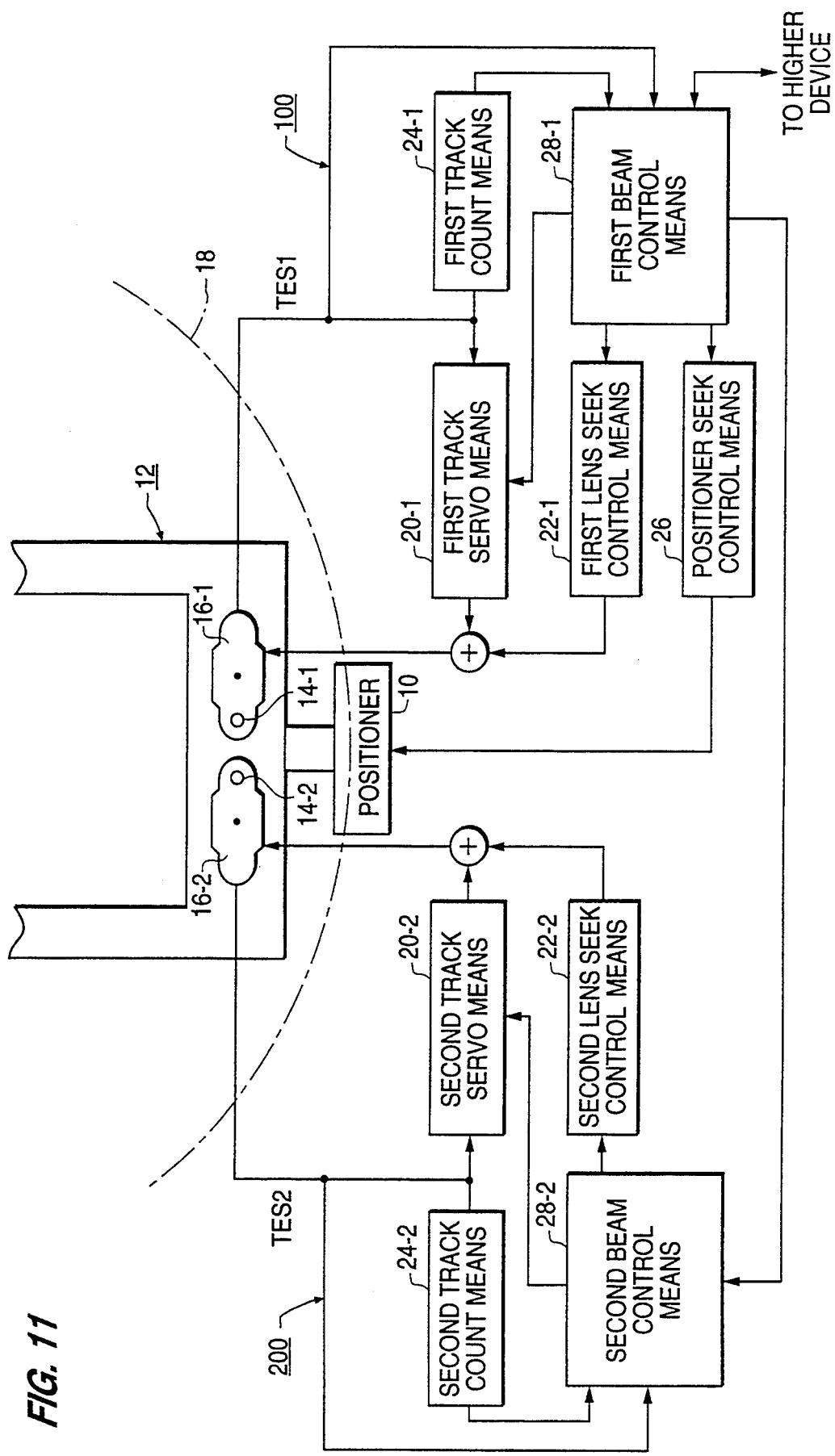
FIG. 11 is a view explaining a principle of another aspect of the invention.

FIG. 11 shows another aspect of the invention. Before explaining this aspect, the problems of a prior art will be explained with reference to FIGS. 15 and 16.

Figure 15:
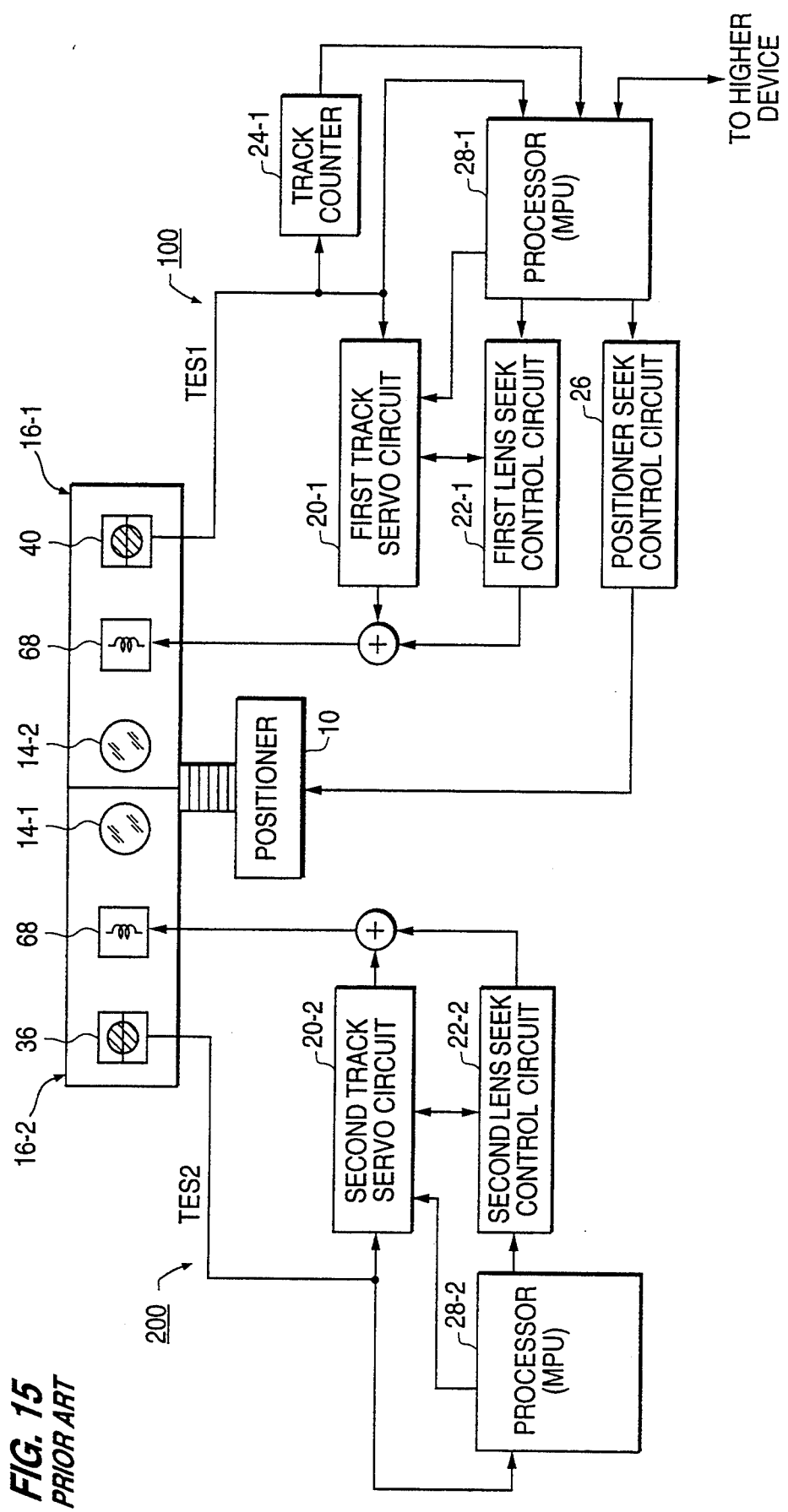
FIG. 15 is a schematic view showing positioner seek control according to a prior art.

FIG. 15 is a schematic view showing a conventional seek control system.

In FIG. 15, an erase beam position control portion 100 comprises a first track servo circuit 20-1 for driving the lens actuator 16-1 according to a tracking error signal TES1 of an erase beam, to carry out tracking control of the erase beam, a first lens seek control circuit 22-1 for driving the lens actuator 16-1 to seek a target track with the erase beam, a first track counter 24-1 for counting the number of tracks crossed by the erase beam according to the tracking signal TES1 of the erase beam, a positioner seek control circuit 26 for driving a VCM positioner 10 according to the erase beam, to move the erase beam and a write beam to the target track, and a processor (MPU) 28-1 for totally controlling the position of the erase beam.

Upon receiving a seek instruction from a higher controller, the processor 28-1 turns OFF the present track servo operation by the first track servo circuit 20-1, and ON the positioner seek control circuit 26 to drive the VCM positioner 10 to move the erase and write beams toward a target track.

Figure 16:
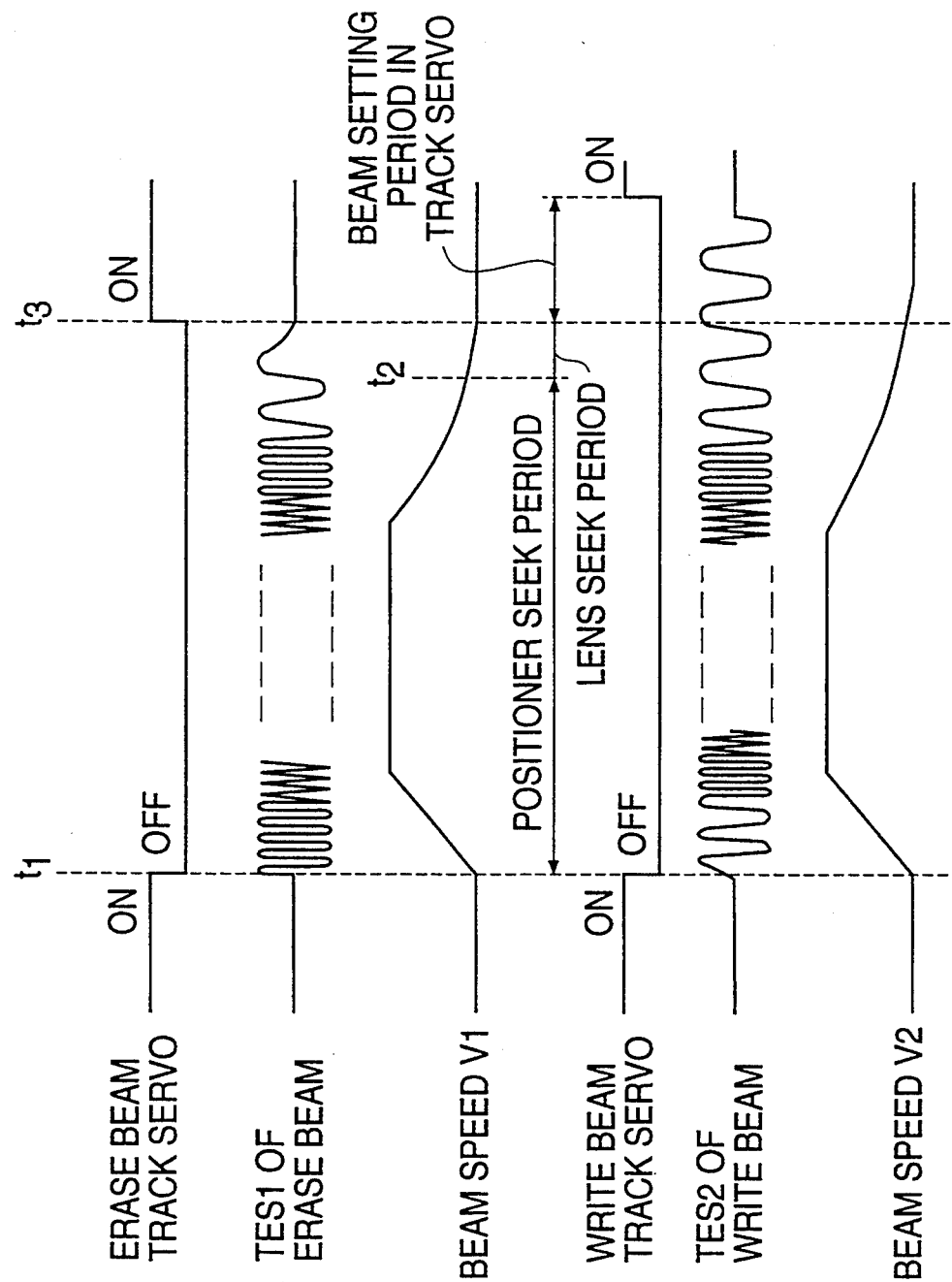
FIG. 16 is an explanatory view showing a positioner seek operation according to the prior art.

Namely, as shown in FIG. 16, the track servo control is turned OFF at time t1 according to the seek instruction, and the positioner seek operation is carried out to accelerate, maintain, and decelerate the speed of the erase beam (the first beam) as indicated with a beam speed V1, thereby moving the erase beam close to the target track. When the beam speed V1 of the erase beam decreases to a lens seek possible level due to the positioner deceleration operation in front of the target track at time t2, the first lens seek control circuit 22-1 is turned ON to drive the lens actuator 16-1 to move the erase beam onto the target track by the lens seek operation. During this lens seek operation, it is monitored whether or not a track difference is zeroed according to the number of crossed tracks counted by the track counter 24-1 according to the tracking error signal TES1. When it is zeroed at time t3, it is determined that the seek operation has been completed. Then, the lens seek and positioner seek operations are terminated, and the track servo operation is resumed to set the erase beam on the target track.

On the other hand, a write beam position control portion 200 comprises a second track servo circuit 20-2 for driving the lens actuator 16-2, to carry out tracking control of the write beam, and a second lens seek control circuit 22-2 for driving the lens actuator 16-2, to seek the target track with the write beam. Upon receiving the seek instruction of the higher controller through the processor 28-1, the processor 28-2 turns OFF the track servo control of the write beam by the second track servo circuit 20-2 at time t1 of FIG. 10, and again turns ON the second track servo circuit 20-2 after receiving the seek completion notice of the VCM positioner 10 for the erase beam at time t3, to set the write beam on the target track.

According to the lens seek control of the conventional two-actuator system, a seek time will be elongated if a time for the servo control of the second beam, i.e., the write beam, is taken into account. The erase beam, for which the number of crossed tracks is counted, may be correctly positioned on a target track. The write beam for which the number of crossed tracks is not counted and which is moved to the target track according to the seek operation of the erase beam frequently causes a deviation from the target track. If the deviation happens, a corrective seek operation must be carried out for the write beam. This causes a problem of extending an access time longer than that of a conventional one-actuator magneto-optic disk unit.

In consideration of this problem, an object of this aspect of the invention is to prevent a deviation (off-track) of the second beam due to the positioner seek operation for the first beam, to thereby shorten the access time.

FIG. 11 explains a principle of this aspect of the invention. As explained with reference to FIG. 1, the invention is applied to a magneto-optic disk unit having a positioner 10, an optical head 12 driven by the positioner 10 across tracks of a medium 18, and first and second lens actuators 16-1 and 16-2 having respective object lenses 14-1 and 14-2. First and second beams are emitted through the object lenses 14-1 and 14-2 onto the same track on the medium 18.

A seek control system according to the invention for this kind of magneto-optic disk unit comprises first beam position control means 100 involving:

first track servo means 20-1 for driving the first lens actuator 16-1 according to a tracking error signal TES1 of the first beam, to carry out tracking control of the first beam;

first lens seek control means 22-1 for driving the first lens actuator 16-1 to seek a target track with the first beam;

first track count means 24-1 for counting the number of tracks crossed by the first beam according to the tracking signal TES1 of the beam;

positioner seek control means 26 for driving the positioner 10 according to the first beam, thereby to move the first and second beams to the target track; and first beam control means 28-1 for turning OFF the track servo control by the first track servo means 20-1 and ON the positioner seek control means 26 upon receiving a seek instruction from a higher device, thereby to move the first and second beams toward a target track, and when a beam speed decreases below a specified value in front of the target track, turning ON the first lens seek control means 22-1 to carry out a lens seek operation.

The system also comprises second beam position control means 200 involving:

second track servo means 20-2 for driving the second lens actuator 16-2 according to a tracking error signal TES2 of the second beam, to carry out tracking control of the second beam;

second lens seek control means 22-2 for driving the second lens actuator 16-2 to seek the target track with the second beam;

second track count means 24-2 for counting the number of tracks crossed by the second beam according to the tracking signal TES2 of the beam; and second beam control means 28-2 for turning OFF the track servo control by the second track servo means 20-2 and, when the moving speed of the second beam by the positioner 10 decreases below the specified value, turning ON the second lens seek means 22-2 to carry out a lens seek operation.

When the speed of the second beam decreases to the specified speed for enabling the lens seek operation after the completion of acceleration for the positioner seek operation, the second beam control means 28-2 turns ON the second lens seek control means 22-2 to seek the track with the second beam.

The second beam control means 28-2 notifies the first beam control means 28-1 of the completion of the seek operation with the second beam, and the first beam control means 28-1 notifies the higher device of the completion of the seek operation upon receiving the seek operation completion notice from the second beam control means 28-2 after the seek operation with the first beam is completed.

When a track difference based on the number of crossed tracks counted by the first track count means 24-1 has zeroed during the lens seek operation, the first beam control means 28-1 terminates the lens seek operation with the first beam as well as the positioner seek operation and, at the same time, turns ON the first track servo means 20-1 to start the tracking control. When a track difference based on the number of crossed tracks counted by the second track count means 24-2 has zeroed during the lens seek operation, the second beam control means 28-2 terminates the lens seek operation with the second beam and, at the same time, turns ON the second track servo means 20-2 to start the tracking control.

According to the invention, the first beam is an erase beam and the second beam is a write beam.

According to the above seek control system of this aspect of the invention for the magneto-optic disk unit, the number of tracks crossed by the second beam (write beam) is also counted during a positioner seek operation for seeking a target track with the first beam (erase beam) and, when the moving speed of the second beam decreases to a lens seek possible level, a lens seek operation with the second beam is carried out according to the number of crossed tracks counted. Accordingly, the target track is correctly sought with the second beam as well .through only one seek operation, i.e., with no correction seek operation. This realizes the same access speed as that in a one-actuator magneto-optic disk unit.

Figure 12:
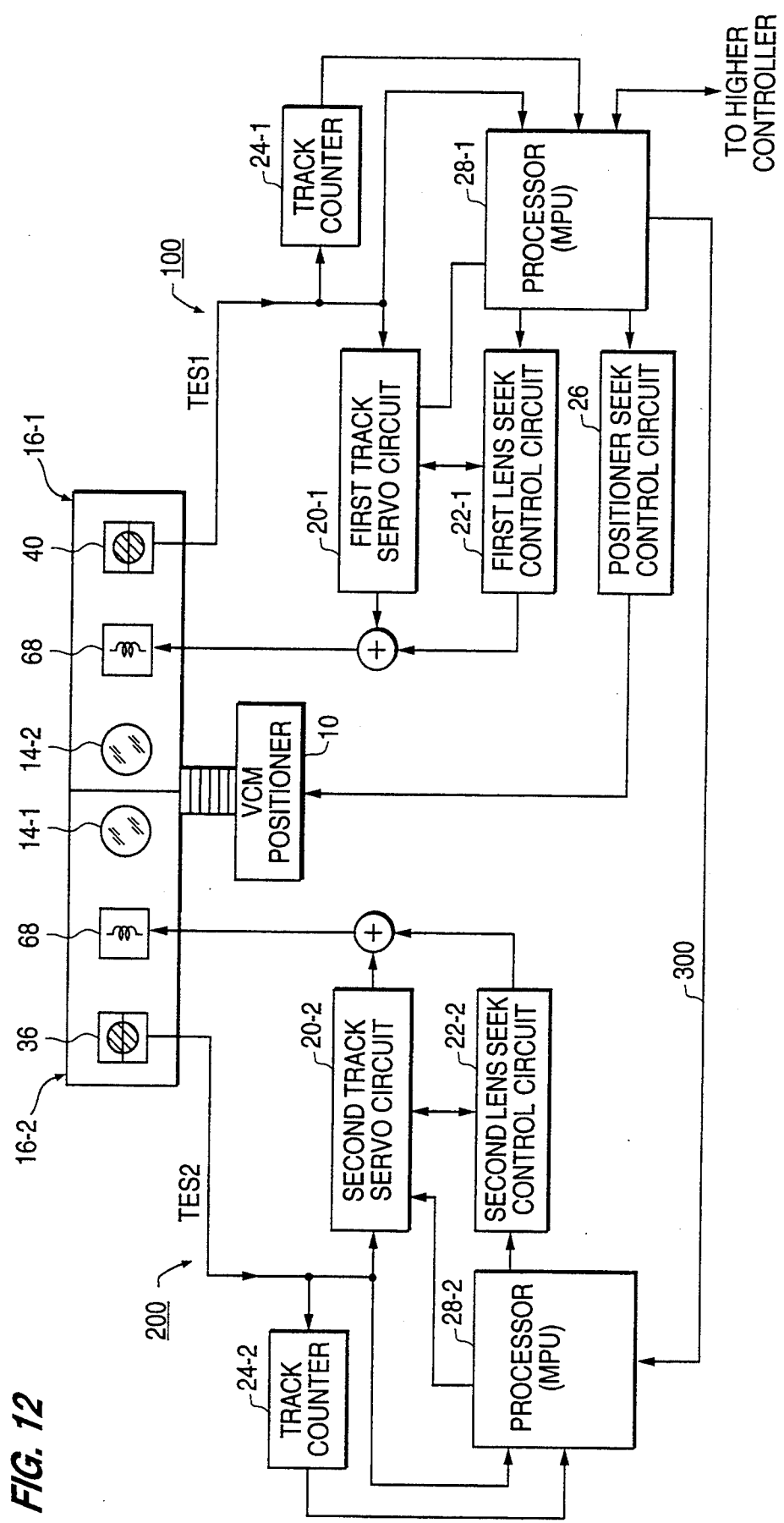
FIG. 12 is a schematic view showing an embodiment of the invention of FIG. 11.

FIG. 12 is a schematic view showing an embodiment of the invention of FIG. 11.

In FIG. 12, lens actuators 16-1 and 16-2 are disposed on a movable optical system and moved together across tracks by a VCM positioner 10. The track actuators 16-1 and 16-2 include tracking error detectors 36 and 40 object lenses 14-1 and 14-2, and tracking coils 68, respectively.

Firstly, a position control portion 100 for controlling the lens actuator 16-1 will be explained.

The erase beam position control portion 100 comprises a first track servo circuit 20-1 for carrying out tracking control of a write beam according to a tracking error signal TES1; a first lens seek control circuit 22-1 for driving the first track actuator 16-1 according to a track difference obtained from the tracking error signal TES1, thereby to seek a target track with an erase beam; a track counter 24-1 for counting the number of tracks crossed by the erase beam according to the tracking error signal TES1; a positioner seek control circuit 26 for driving the VCM positioner 10 according to the track difference obtained from the tracking error signal TES1 of the erase beam, thereby to carry out a positioner seek operation with the erase and write beams; and a processor (MPU) 28-1 for carrying out total seek control in response to a seek instruction from a higher controller.

The track counter 24-1 detects zero crossings of the tracking error signal TES1, and detects the number of tracks crossed by the erase beam according to the number of the zero crossings. The tracking error signal TES1 is directly given to the processor 28-1, which can compute the moving speed of the erase beam according to, for example, a period of the tracking error signal, and thereby control the speed of the lens seek and positioner seek operations.

Next, a write beam position control portion 200 will be explained. The write beam position control portion 200 comprises a second track servo circuit 20-2 for carrying out the tracking control of the write beam according to a tracking error signal TES2 of the write beam; a second lens seek control circuit 22-2 for driving the lens actuator 16-2 to carry out a lens seek operation with the write beam; and a processor 28-2 serving as write beam control means for totally controlling the position of the write beam. In addition, the present invention newly arranges a track counter 24-2 for counting the number of crossed tracks according to the tracking error signal TES2 of the write beam.

Further, a communication bus 300 is arranged between the processor 28-1 and the processor 28-2. When receiving a seek instruction from the higher controller, the processor 28-1 notifies the processor 28-2 of this instruction. When completing a seek operation with the erase beam, the processor 28-1 notifies the processor 28-2 of the completion. After completing the seek operation with the erase beam and after receiving a seek completion notice for the write beam from the processor 28-2, the processor 28-1 notifies the higher controller of the seek completion.

The erase beam seek control operation by the processor 28-1 and the write beam seek control operation by the processor 28-2 in the embodiment of FIG. 12 now will be explained with reference to a basic operation flowchart of FIG. 13A.

Figure 13A:
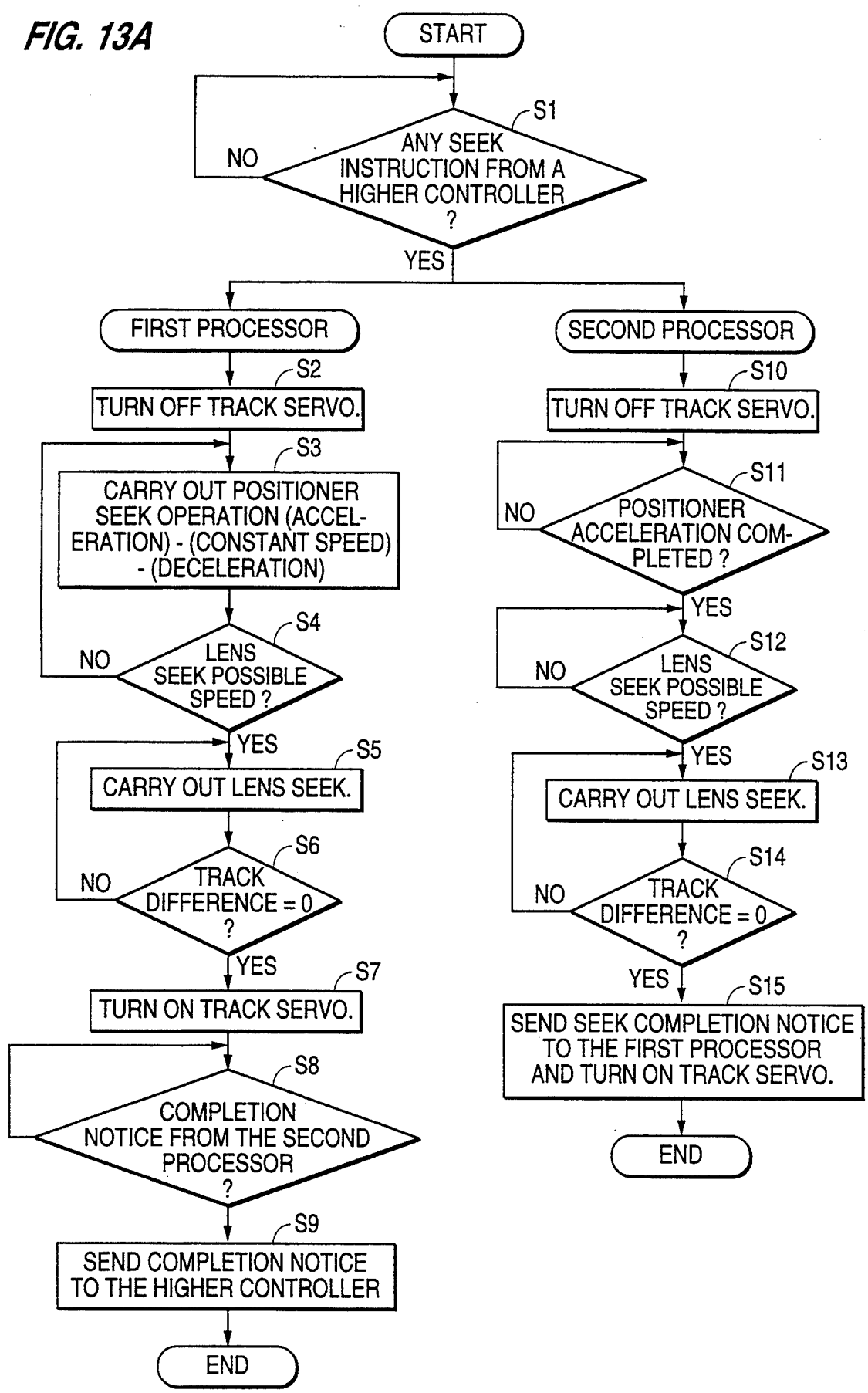
FIG. 13A is a flowchart showing a basic operation of FIG. 12.
Figure 13B:
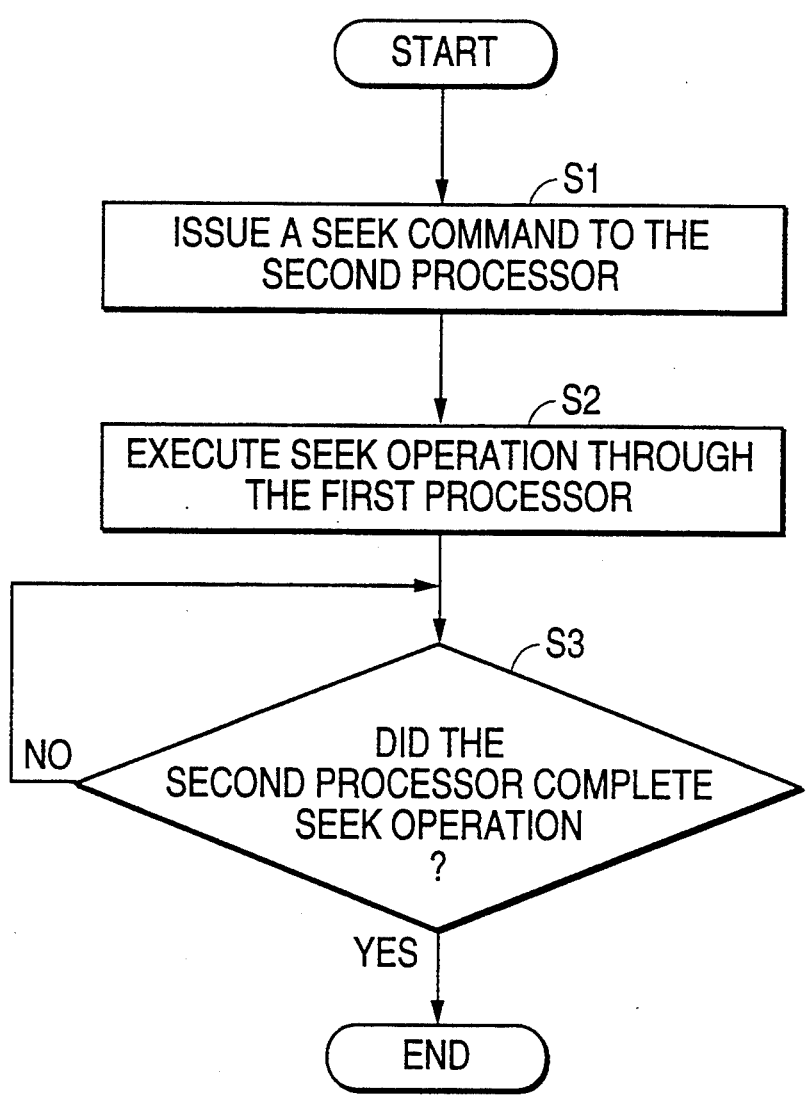
FIG. 13B is a flowchart showing a main operation of a first processor of FIG. 12.

In FIG. 13A, Step S1 (hereinafter, the word "Step" is omitted) determines that the first processor 28-1 has received a seek instruction from the higher controller, and informs the processor 28-2 of the contents of the seek instruction, so that the processors 28-1 and 28-2 may start seek operations in parallel (FIG. 13B).

Firstly, the erase beam seek operation of the processor 28-1 (first processor) will be explained.

For starting the erase beam seek operation, S2 firstly turns OFF the first track servo circuit 20-1 to cancel the present track servo operation and, at the same time, activates the positioner seek control circuit 26 to carry out a positioner seek operation. More precisely, as indicated from time t1 to t2 on a VCM positioner current shown in FIG. 14, which is an explanatory view of the positioner seek operation, the positioner is accelerated in an initial seek stage by flowing an acceleration current thereto, kept at a constant speed after the completion of the acceleration, and decelerated by flowing a deceleration current thereto when a track difference relative to a target track reduces to a difference valve below a specified value.

During the positioner seek operation, S4 monitors whether or not the moving speed of the erase beam has been reduced to a lens seek possible value. When S4 determines that the beam speed has decreased to the lens seek possible value, S5 activates the first lens seek control circuit 22-1 to drive the track actuator 16-1 by energizing the tracking coil 68, to start a lens seek operation for moving the object lens 14-1 to the target track. This lens seek operation is started at time t2 of FIG. 14.

During the lens seek operation of S5, S6 checks to see whether or not a track difference has zeroed. When the track difference has zeroed after the beam reaches the target track at time t3, S6 determines that the seek operation has been completed, and stops the lens seek and positioner seek operations. S7 activates the first track servo circuit 20-1 which has been in an OFF status during the seek operation, to start the track servo control and set the erase beam on the target track according to the tracking control.

S8 monitors a seek completion notice from the processor 28-2 (second processor) of the write beam side. Upon receiving the seek completion notice, S9 notifies the higher controller of the seek completion.

Next, the write beam seek operation by the processor 28-2 is explained.

Firstly, S10 stops the servo control by the second track servo circuit 20-2 to turn OFF the track servo control. Under this state, a beam speed obtained from the tracking error signal TES2 of the write beam is monitored. S11 checks to see whether or not the positioner has been accelerated. When S11 determines that the positioner acceleration has been completed, S12 monitors whether or not the beam speed has been decreased to a lens seek possible level. Meanwhile, the erase beam positioner seek operation on the processor 28-1 side has progressed, and the positioner is decelerated in front of the target track. Then, S12 determines that the beam speed has reached the lens seek possible level. Namely, at time t2' on a second lens actuator current plot of FIG. 14, it is determined that the lens seek possible speed has been attained.

S13 activates the second lens seek control circuit 22-2 to let the lens actuator 16-2 start a lens seek operation with the write beam. During the lens seek operation, S14 monitors whether or not a track, difference relative to the target track obtained according to the number of crossed tracks provided by the track counter 24-2, has been zeroed. When the track difference has zeroed, it is determined that the seek operation has been completed and the lens seek operation is stopped. S5 notifies the first processor 28-1 of the seek completion and turns ON the track servo control by the second track servo circuit 20-2, thereby to set the write beam on the target track.

Figure 14:
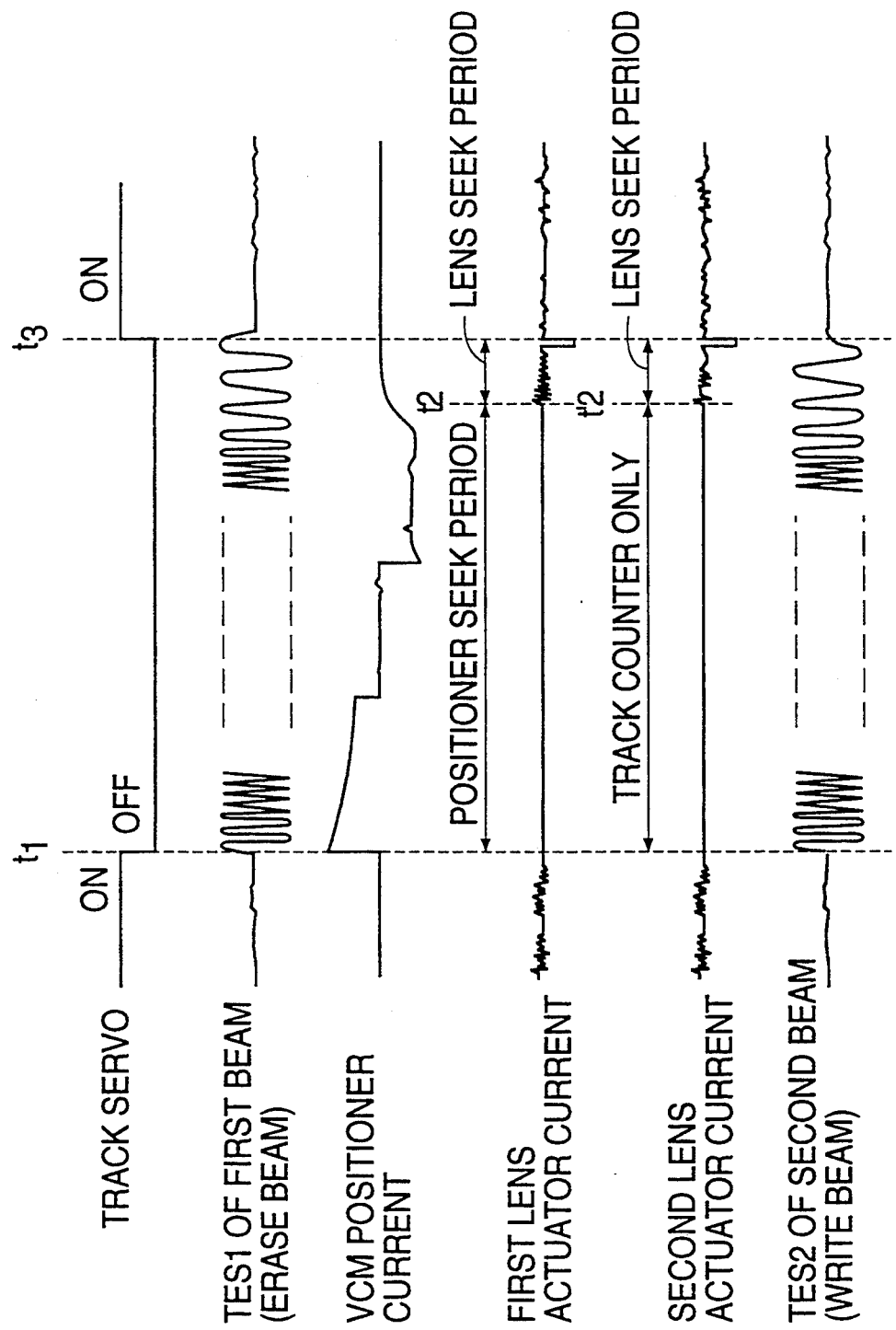
FIG. 14 is an explanatory view showing a positioner seek operation of the invention of FIG. 11.

Concerning with the first lens actuator current and second lens actuator current shown in FIG. 14 for explaining the positioner seek operation, deceleration pulses are provided to the tracking coils 68 of the lens actuators 16-1 and 16-2 just in front of the target track, so that the beams may surely be set on the target track.

In connection with a read beam C to be passed through the same object lens 14-2 as for the write beam of the embodiment, position lock control is carried out for maintaining the galvanomirror 50 at a neutral position during the seek operation, so that the beam may be positioned on the same track as the write beam with no special seek operation.

FIGS. 13B through 13E are flowcharts for supplementing the basic operation flowchart of FIG. 13A.

FIG. 13B is a main flowchart for the first processor. As explained above, the first processor receives a seek instruction from the higher controller and transfers it to the second processor (Step S1). In response to the seek instruction, the second processor starts a seek operation in parallel with the first processor. The first processor carries out the seek operation as explained with reference to FIG. 13A (Step S2). Lastly, the first processor determines whether or not the second processor has completed its own seek operation (Step S3), and if completed, notifies the higher controller of the completion. The flow then ends.

Figure 13C:
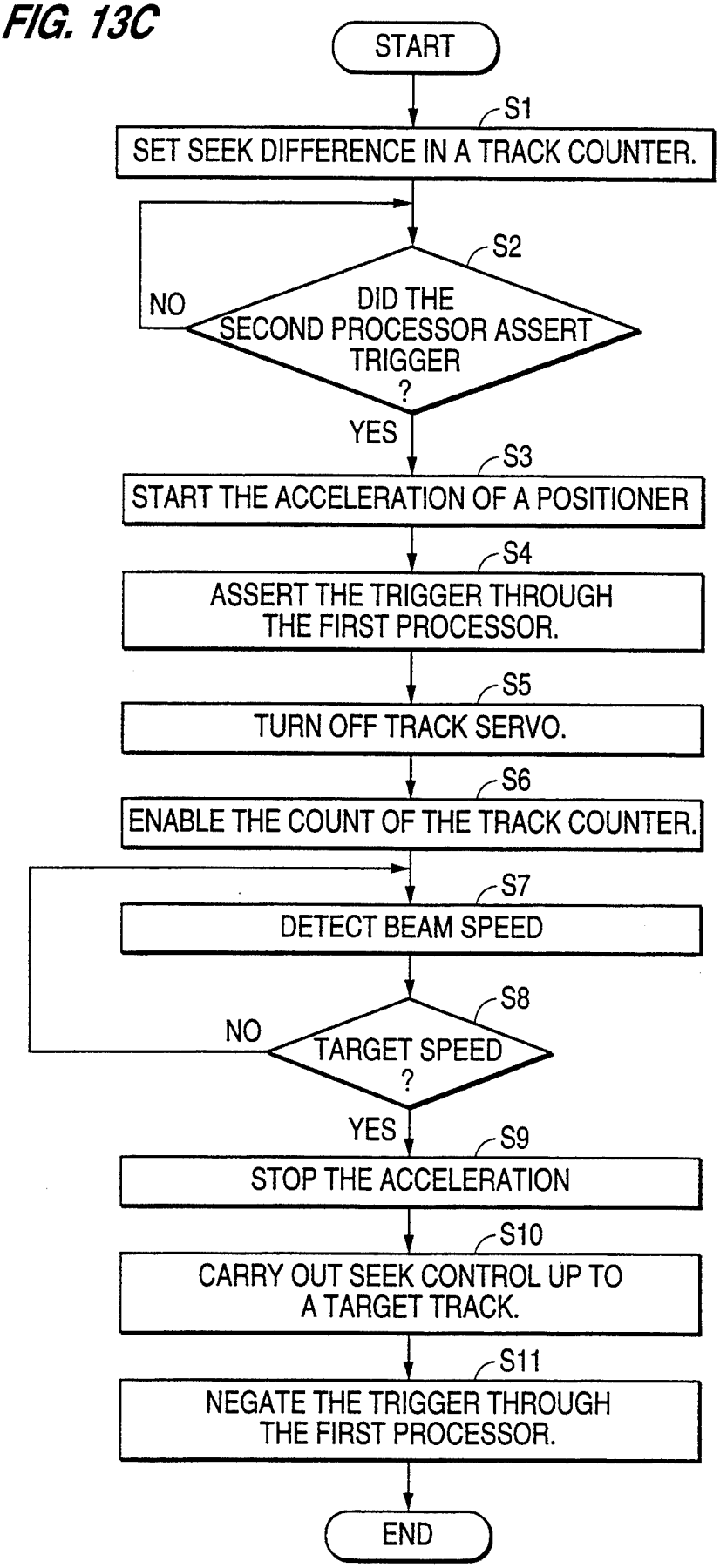
FIG. 13C is a flowchart showing a seek operation of the first processor of FIG. 12.

FIG. 13C is a flowchart showing the seek operation of the first processor. Firstly, a seek difference is set in the track counter (S1). The first processor determines whether or not the second processor has asserted a trigger (S2) and, if asserted, starts to accelerate the positioner (S3). The first processor asserts a trigger (S4), and turns OFF the track servo operation (S5). (Refer to Step S2 of FIG. 13A.) The track counter enables a count (S6), and a beam speed is detected (S7). It is determined whether or not a high seek target speed has been attained (S8). If it has been attained, the acceleration is stopped (S9), and a seek operation is carried out to obtain a target track (S10). (Refer to Steps S3 through S6 of FIG. 13A.) The first processor negates the trigger (S11) and turns ON the seek operation. The flow then ends.

Figure 13D:
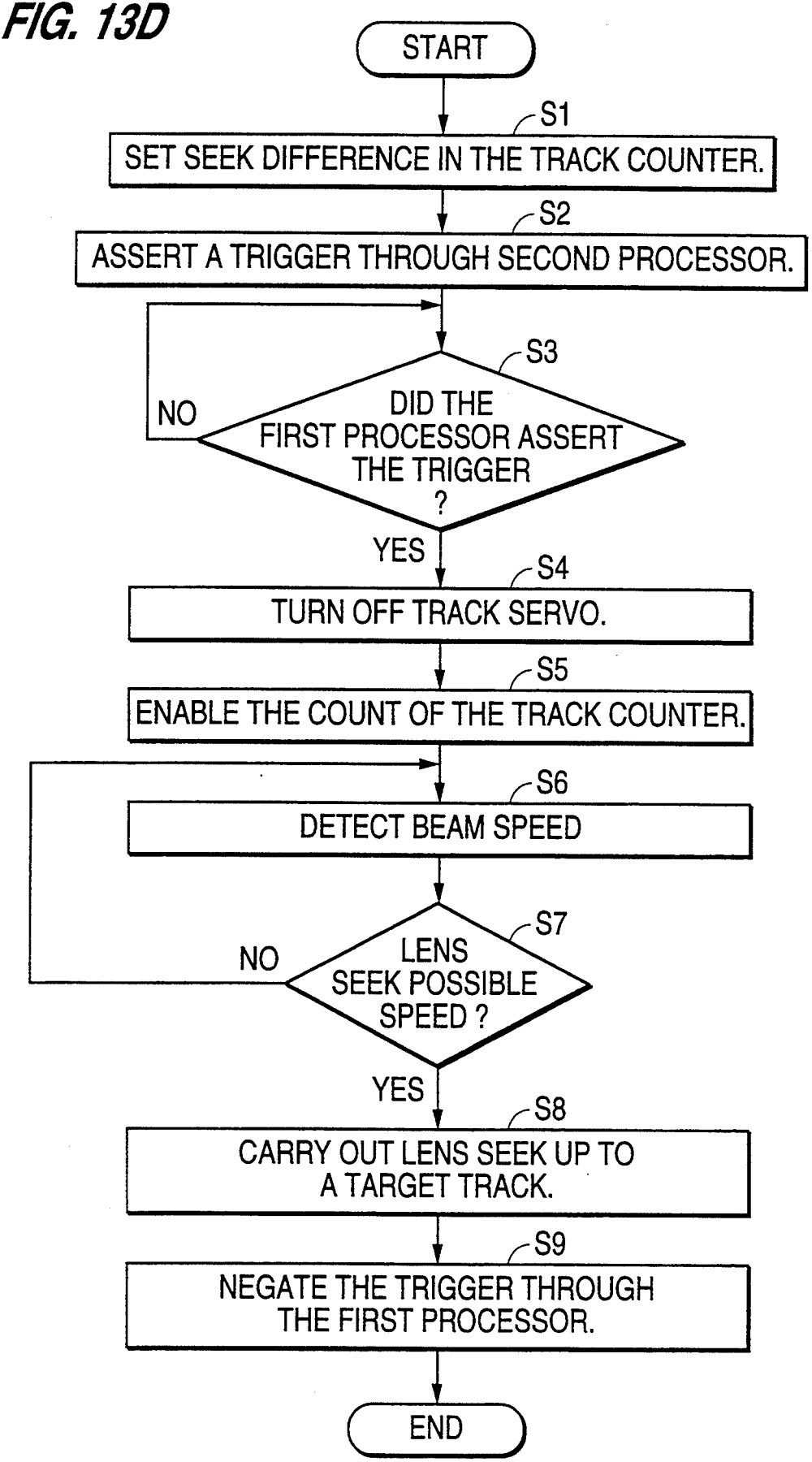
FIG. 13D is a flowchart showing a seek command operation of a second processor of FIG. 12.

FIG. 13D is a flowchart for the seek command to the second processor. Firstly, a seek difference is set in the track counter (S1). The second processor asserts the trigger-(S2), determines whether or not the first processor has asserted the trigger (S3) and, if asserted, turns OFF the track servo operation. (Refer to Step S10 of FIG. 13A.) The track counter enables a count (S5), and a beam speed is detected (S6). It is determined whether or not a lens seek possible speed has been attained (S7). If the lens seek possible speed has been attained, a lens seek operation is carried out up to the target track (S8). (Refer to Steps S11 through S13 of FIG. 13A.) The second processor negates the trigger (S9) and turns ON the track servo operation. Then, the flow ends.

Figure 13E:
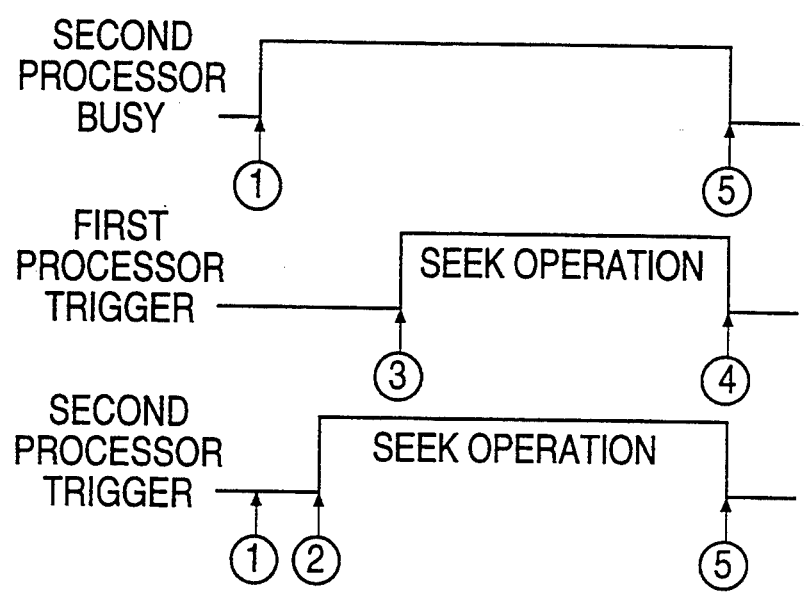
FIG. 13E is a timing chart showing control signals between the first and second processors of FIG. 12.

FIG. 13E is a timing chart showing control signals between the first and second processors. At timing (1), the first processor issues the seek command to the second processor. This timing corresponds to Step S1 of FIG. 13B. At timing (2), the second processor returns, in response to the seek instruction from the first processor, a seek start wait signal to the first processor, and starts the seek operation (positioner acceleration). This corresponds to Step S2, and onward, of FIG. 13B. The first and second processors carry out the seek operations and then stop them at timing (4) and (5).

As explained above, the second aspect of the invention directly counts the number of tracks crossed by the second beam (write beam) so that the second beam control system, which does not control the VCM positioner, may correctly seek a target track with the second beam according to a track difference, similar to the first beam control system that carries out a seek operation with the VCM positioner. The invention, therefore, eliminates a corrective seek operation for the second beam and achieves a high-speed track access, similar to a single actuator magneto-optic disk unit.

The invention provides a seek control system of a magneto-optic disk unit having an optical head driven by a VCM positioner, two lens actuators disposed on the optical head, and object lenses disposed on the lens actuators, respectively, for passing first and second beams (erase and write beams) to irradiate an identical track on a medium to record and reproduce data thereto and therefrom. This system shortens an access time needed for accessing a target track through a lens seek operation carried out by driving the two lens actuators. Also, the system prevents a deviation (off-track) of the second beam from the target track during the VCM positioner seek operation carried out according to the first beam, to further shorten the access time. The magneto-optic disk unit with the seek control system, therefore, achieves high-speed erase and write operations.

We claim:

1. An optical disk apparatus comprising:
a recording medium having a plurality of tracks thereon;
first and second objective lenses, said first objective lens impinging a first beam onto said recording medium and said second objective lens impinging a second beam onto said recording medium;
a first lens actuator which moves said first objective lens and a second lens actuator which moves said second objective lens;
first and second detectors, said first detector detecting a tracking error for the first beam from a track on said recording medium and said second detector detecting a tracking error for the second beam from a track on said recording medium, said first and second detectors producing first and second tracking error signals, respectively; first beam position control means, comprising:
first track servo control means for controlling said first lens actuator to follow a track of the recording medium in accordance with the tracking error signal produced by said first detector,
first track count means, responsive to the first tracking error signal, for counting a number of tracks crossed by the first beam,
first lens seek control means for controlling said first lens actuator to seek, from a current track to a specified target track, with the first beam based upon the number of tracks counted by said first track count means,
positioner seek control means for moving both the first and second beams from a current track toward a specified target track based upon the number of tracks counted by said first track count means,
first beam control means for controlling said first track servo control means, said first lens seek control means, and said positioner seek control means, said first beam control means, in accordance with receiving a seek instruction with a specified target track from an external source, disabling said first track servo control means, enabling said positioner seek control means thereby to move both the first and second beams and enabling said first lens seek control means when said first track count means indicates that the first beam has been moved to a position closely adjacent the specified target track, as instructed from the external source, by said positioner seek control means;
means for notifying completion of a seek operation of the first and second beams, based upon a determination of whether a seek operation of the second beam has been completed; and second beam position seek control means comprising:
second track servo control means for controlling said second lens actuator to follow a track of the recording medium in accordance with the tracking error signal produced by said second detector,
second track count means, responsive to the second tracking error signal, for counting a number of tracks crossed by the second beam,
second lens seek control means for controlling said second lens actuator to seek, from a current track to a specified target track, with the second beam based upon the number of tracks counted by said second track count means,
second beam control means for controlling said second track servo control means and said second lens seek control means, said second beam control means, in accordance with the same seek instruction received by said first beam control means, disabling said second track servo control means, enabling said second track count means and enabling said second lens seek control means when said second track count means indicates that the second beam has been moved to a position closely adjacent the specified target track, as instructed from the external source, by said positioner seek control means; and means for notifying said first beam position control means of a completion of a seek operation of the second beam.

2. An optical disk apparatus according to claim 1, wherein:

the second beam control means, further, notifies the first beam control means of completion of the seek operation of the second lens seek control means with the second beam; and the first beam control means notifies external sources of the completion of the seek operation by the seek control system upon receiving the seek completion notification from the second beam control means after the seek operation of the first beam control means with the first beam is completed.

3. An optical disk apparatus according to claim 1, wherein:

when a track difference based on the number of crossed tracks counted by the first track count means has zeroed during the lens seek operation of the first lens actuator, the first beam position control means terminates the lens seek operation with the first beam as well as the positioner move operation and, at the same time, enables the first track servo control means to start controlling the first lens actuator; and when a track difference based on the number of crossed tracks counted by the second track count means has zeroed during the lens seek operation of the second lens actuator, the second beam control means terminates the lens seek operation with the second beam and, at the same time, enables the second track servo control means to start controlling the second lens actuator.

4. An optical disk apparatus according to claim 1, wherein the first beam is an erase beam, and the second beam is a write beam.

5. An optical disk apparatus according to claim 1, wherein:

said first beam control means is a microprocessor; and
said second beam control means is a microprocessor.

* * * * *

UNITED STATES PATENT AND TRADEMARK OFFICE
CERTIFICATE OF CORRECTION

PATENT NO. : 5,444,684
DATED : August 22, 1995
INVENTOR(S) : YANAGI et al.

Page 1 of 2

It is certified that error appears in the above-indentified patent and that said Letters Patent is hereby corrected as shown below:

TITLE PAGE: [57] ABSTRACT:
  line 1, delete "is used";
  line 8, change "an access" to --the access--.

On the title page, item [63]: should read--Continuation of Ser.852.241--.

filed on Pct/JP91/01335,Oct. 3,1991.

Col. 7,   line 31, change "preformed" to --pre-formed--;
          line 65, change "preformed" to --pre-formed--.

Col. 9,   line 32, after "t2'" insert --,--.

line 6, after "07/852,241," insert --Jun. 2, 1992, now abandoned,--;
          line 7, delete ", now abandoned".

Col. 7,   line 31, change "preformed" to --pre-formed--;
          line 65, change "preformed" to --pre-formed--.

Col. 9,   line 32, after "t2'" insert --,--.

UNITED STATES PATENT AND TRADEMARK OFFICE
CERTIFICATE OF CORRECTION

PATENT NO. : 5,444,684
DATED : Aug. 22, 1995
INVENTOR(S) : YANAGI et al.

It is certified that error appears in the above-indentified patent and that said Letters Patent is hereby corrected as shown below:

Col. 12, line 41, after "40" insert --,--;
        line 42, delete "," (first occurrence);
        line 64, delete ",".

Col. 13, line 53, change "valve" to --value--.

Col. 14, line 42, delete "with".

Col. 15, line 20, change "trigger-(S2)," to --trigger (S2),--.

Signed and Sealed this

Twenty-third Day of April, 1996

Attest:

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,444,684

DATED : August 22, 1995

INVENTOR(S) : Yanagi et al

It is certified that error appears in the above-identified patent and that said Letters Patent is hereby corrected as shown below:

On the title page, item [63]: should read --Continuation of Ser. No. 852,241, filed on PCT/JP91/01335, Oct. 3, 1991, abandoned.--.

TITLE PAGE: [57] ABSTRACT:
    line 1, delete "is used";
    line 8, change "an access" to --the access--.

Col. 1, line 5, change "continuation-in-part" to --continuation of--;
    line 6, after "07/852,241," insert --Jun. 2, 1992, now abandoned,--;
    line 7, delete ", now abandoned".

Col. 7, line 31, change "preformed" to --pre-formed--;
    line 65, change "preformed" to --pre-formed--.

Col. 9, line 32, after "t2'" Insert --,--;

UNITED STATES PATENT AND TRADEMARK OFFICE
CERTIFICATE OF CORRECTION

PATENT NO. : 5,444,684
DATED : Aug. 22, 1995
INVENTOR(S) : YANAGI et al.

It is certified that error appears in the above-indentified patent and that said Letters Patent is hereby corrected as shown below:

Col. 12, line 41, after "40" insert --,--;
line 42, delete "," (first occurrence);
line 64, delete ",".

Col. 13, line 53, change "valve" to --value--.

Col. 14, line 42, delete "with".

Col. 15, line 20, change "trigger-(S2)," to --trigger (S2),--.

This certificate supersedes Certificate of Correction issued April 23, 1996.

Signed and Sealed this

Tenth Day of September, 1996

Attest:

BRUCE LEHMAN

*Attesting Officer*         *Commissioner of Patents and Trademarks*